Feb. 13, 1945.   W. H. ROBERTSON ET AL   2,369,252
ACCOUNTING MACHINE
Filed Sept. 25, 1941      10 Sheets-Sheet 1

William H. Robertson
and Willis E. Eickman
Inventors

By Earl Beust
Their Attorney

Feb. 13, 1945.    W. H. ROBERTSON ET AL    2,369,252
ACCOUNTING MACHINE
Filed Sept. 25, 1941    10 Sheets-Sheet 2

William H. Robertson
and Willis E. Eickman
Inventors

By  Earl Beust
Their Attorney

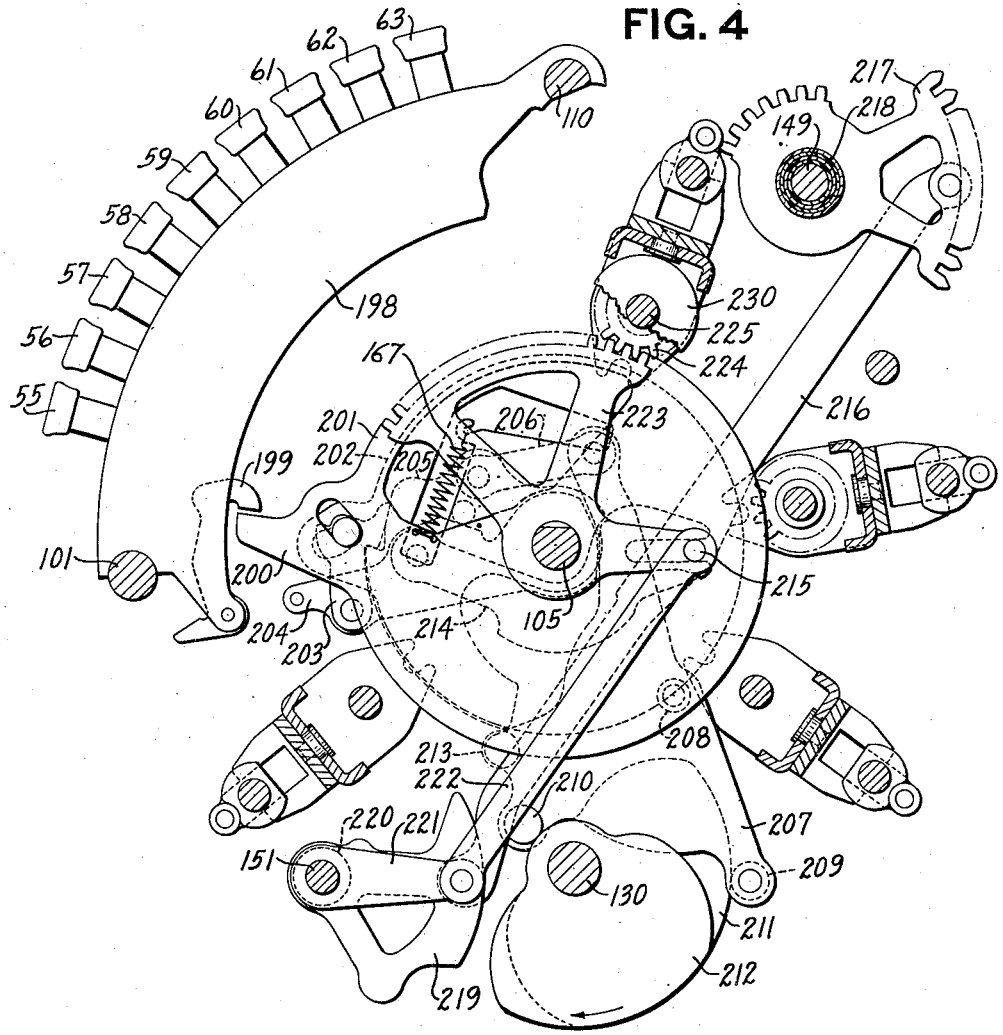

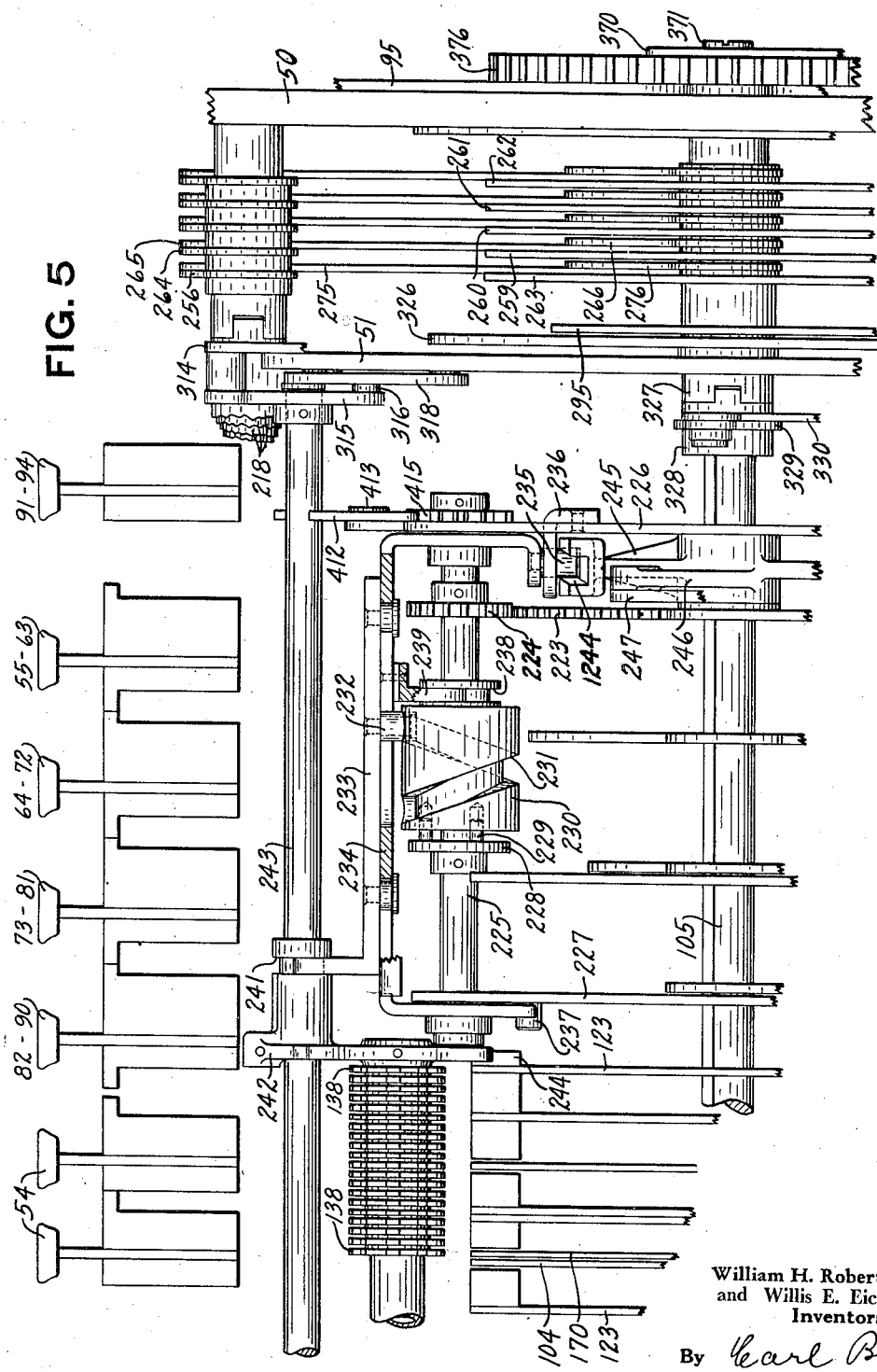

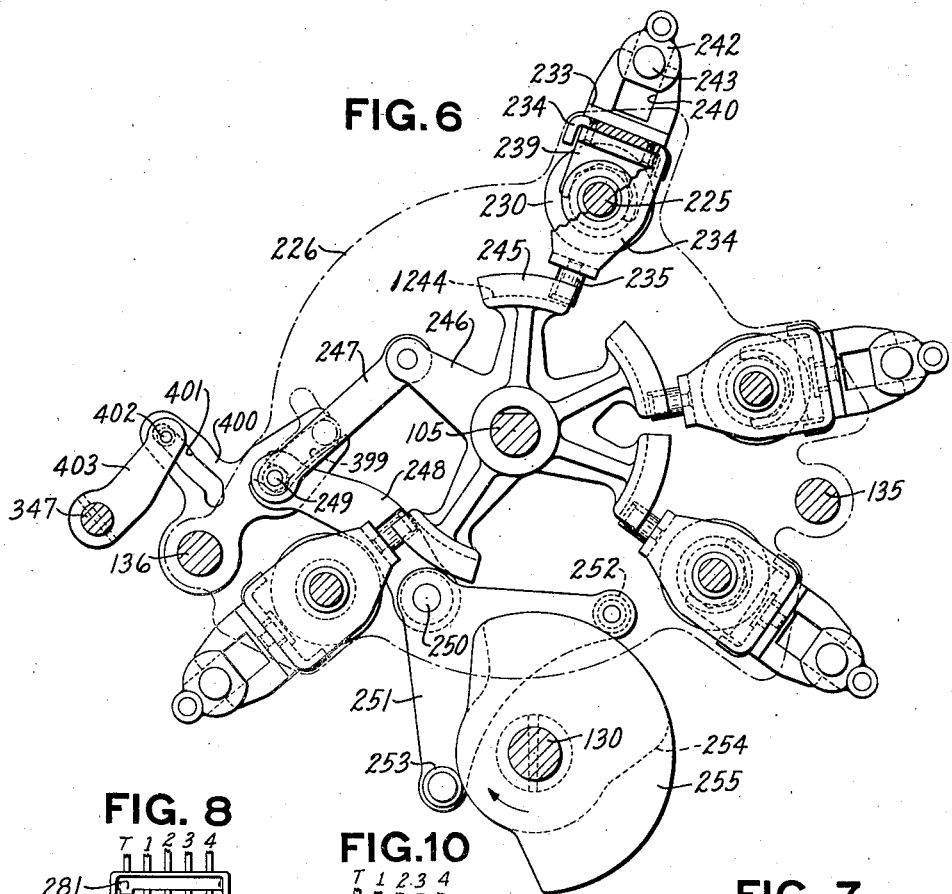

Feb. 13, 1945.   W. H. ROBERTSON ET AL   2,369,252
ACCOUNTING MACHINE
Filed Sept. 25, 1941   10 Sheets-Sheet 6

William H. Robertson
and Willis E. Eickman
Inventors

By Earl Benst
Their Attorney

Feb. 13, 1945.  W. H. ROBERTSON ET AL  2,369,252
ACCOUNTING MACHINE
Filed Sept. 25, 1941    10 Sheets-Sheet 7

William H. Robertson
and Willis E. Eickman
Inventors

By *Earl Beust*

Their Attorney

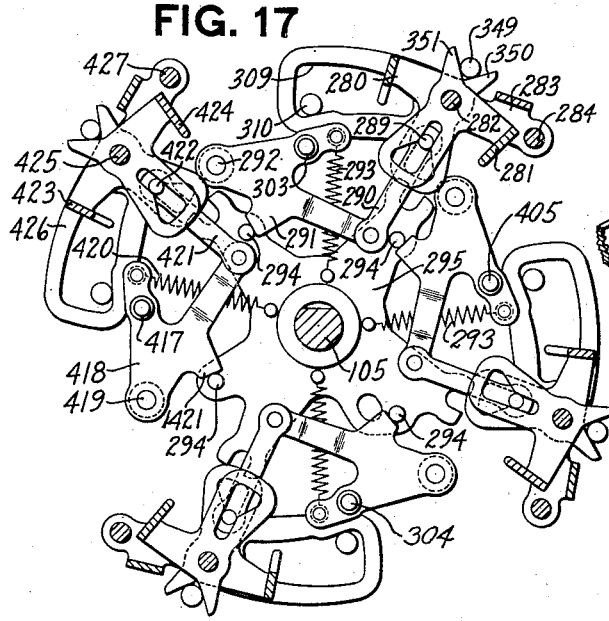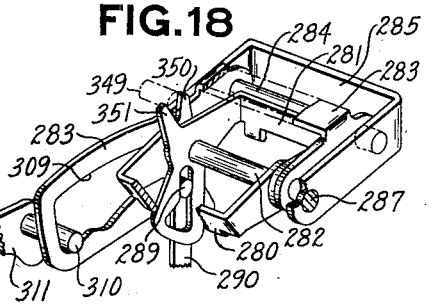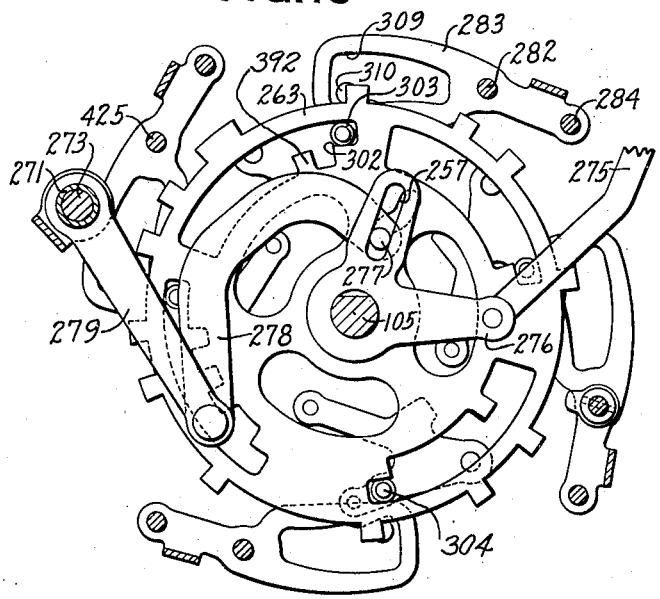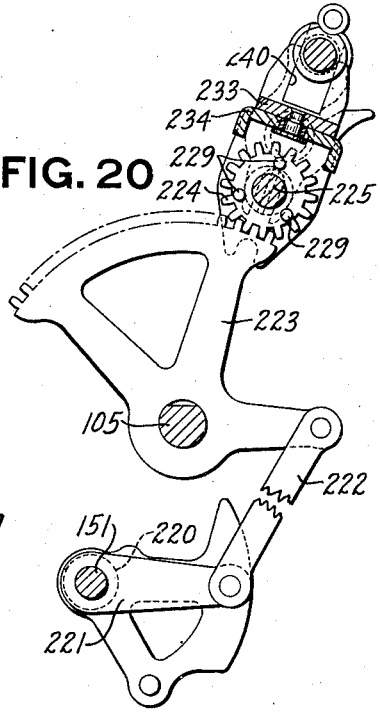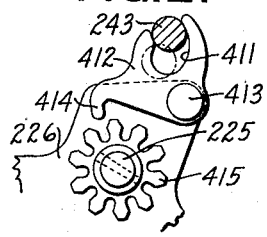

Feb. 13, 1945.   W. H. ROBERTSON ET AL   2,369,252
ACCOUNTING MACHINE
Filed Sept. 25, 1941   10 Sheets-Sheet 9

William H. Robertson
and Willis E. Eickman
Inventors

By Carl Beust
Their Attorney

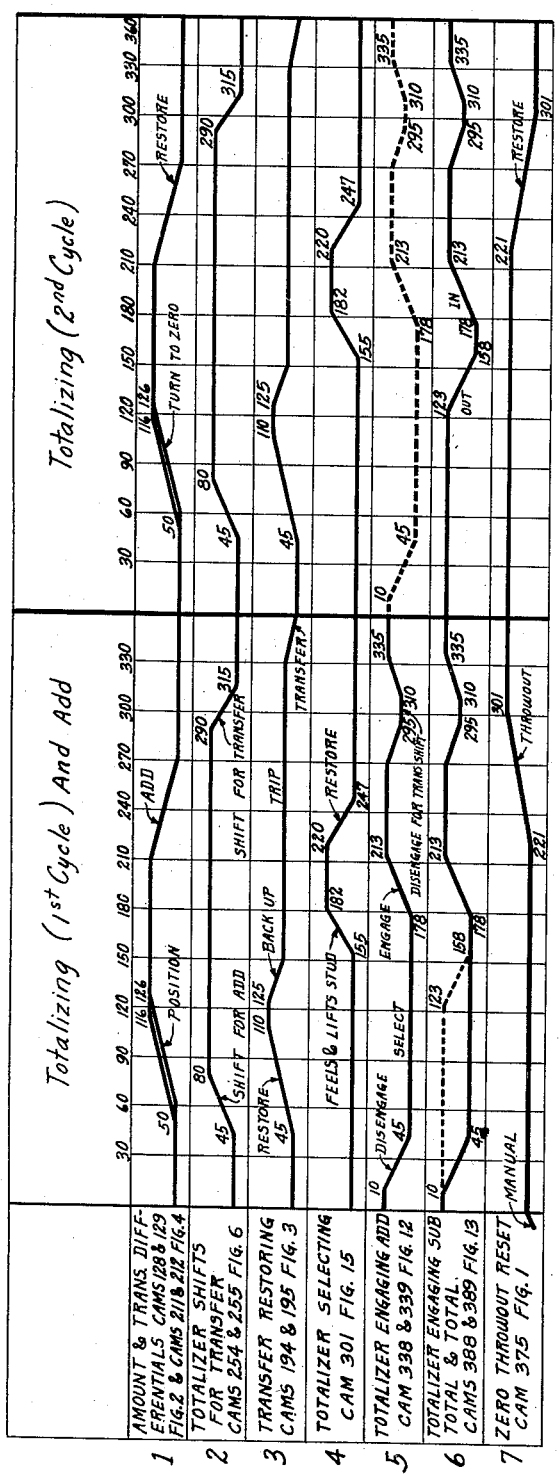

Patented Feb. 13, 1945

2,369,252

UNITED STATES PATENT OFFICE 2,369,252

ACCOUNTING MACHINE

William H. Robertson and Willis E. Eickman, Dayton, Ohio, assignors to The National Cash Register Company, Dayton, Ohio, a corporation of Maryland Application September 25, 1941, Serial No. 412,346

14 Claims. (Cl. 235—6)

The present invention relates to accounting and similar business machines and is particularly directed to the totalizer mechanisms of such machines.

The present invention is embodied in a machine of the general type disclosed in Letters Patent of the United States Nos. 1,619,796; 1,761,542; and 1,916,535, issued, respectively, March 1, 1927; June 3, 1930; and July 4, 1933, to Bernis M. Shipley, No. 2,141,332, issued December 27, 1938, to Charles H. Arnold, and No. 2,176,561, issued October 17, 1939, to Everett H. Placke.

The present invention is directed to the incorporation of four totalizer lines, each supporting a maximum of ten sets of interspersed totalizer wheels, in machines of the general type referred to above. This provides a machine having a maximum of 40 individual totals for the accumulation and the storing of the various items marketed by various merchandising establishments.

A machine of the character referred to above is admirably adapted for the analyzing of the sales of wholesale merchandising establishments and in its present embodiment is arranged for use by a wholesale meat merchant or packing house for the keeping of a complete analysis of the sales of the meat products marketed thereby. However, it is not the desire or intention to limit the machine of this invention to the use outlined above, as with minor alterations it may be arranged for use in connection with numerous other types of businesses.

One object of the present invention is to provide a machine of the character referred to above with a plurality of lines of interspersed totalizers.

Another object is to provide a machine of the character referred to above with four lines of interspersed totalizer sets.

Still another object is to supply means to control the selection of the various totalizer lines for engaging and disengaging movement.

A further object is to provide means to impart engaging and disengaging movement to the selected totalizer lines.

Another object of this invention is to furnish means to select the various sets of totalizers on the various totalizer lines for engagement with the totalizer actuators.

A further object is the provision of novel means for transferring totals from the totalizer sets on one line to the totalizer sets on another line.

A still further object is to provide means, including selecting disks positioned by corresponding transaction and total control keys and feeler mechanisms cooperating with said selecting disks, to select the different totalizer lines for engaging and disengaging movement, and to provide means effective in total-recording operations to impart an auxiliary movement to the selecting disks to cause totals to be transferred from one totalizer to another.

Another object is the provision of means under the control of the total selecting disk for disabling the selecting disk feeler mechanisms in total-recording or resetting operations to cause the selected totalizer to remain in a cleared condition.

Another object is to provide a machine having a plurality of totalizer lines, each supporting a plurality of sets of totalizers, with a selecting disk for each totalizer line and a selecting disk common to all the totalizer lines, said disks positioned by corresponding transaction and total control keys and having cooperating therewith a feeler mechanism for each totalizer line to select said lines for engaging and disengaging movement, said selecting disk common to all the totalizer lines normally effective to render all the feeler mechanisms ineffective, except the feeler mechanism for the totalizer being cleared, and effective, after said totalizer is cleared, to render all the feeler mechanisms ineffective, except the one for the totalizer to which the total is being transferred.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Fig. 4 is a cross-sectional view of the machine, taken immediately to the right of one of the transaction banks, showing in particular the differential mechanism associated with said transaction bank, and the mechanism controlled by said differential mechanism for shifting the corresponding totalizer line laterally to select the different sets of totalizer wheels thereon for engagement with the amount actuators.

Fig. 5 is a diagrammatic front elevation of a portion of the machine, showing in particular the mechanism for shifting the #1 totalizer line laterally to select the different sets of totalizer wheels thereon for engagement with the amount actuators.

Fig. 6 is a right side elevation of the cam mechanism for shifting the four totalizer lines a slight distance laterally to aline the selected set of totalizer wheels with the tens transfer mechanism.

Fig. 7 is a detail view of the mechanism for disabling the transfer shifting mechanism in total-recording operations.

Figs. 8, 9, 10, and 11 show, respectively, detail plan views of a part of the selecting disk feeler mechanisms for the Nos. 1, 2, 3, and 4 rows of transaction keys and the corresponding totalizer lines.

Figure 12:
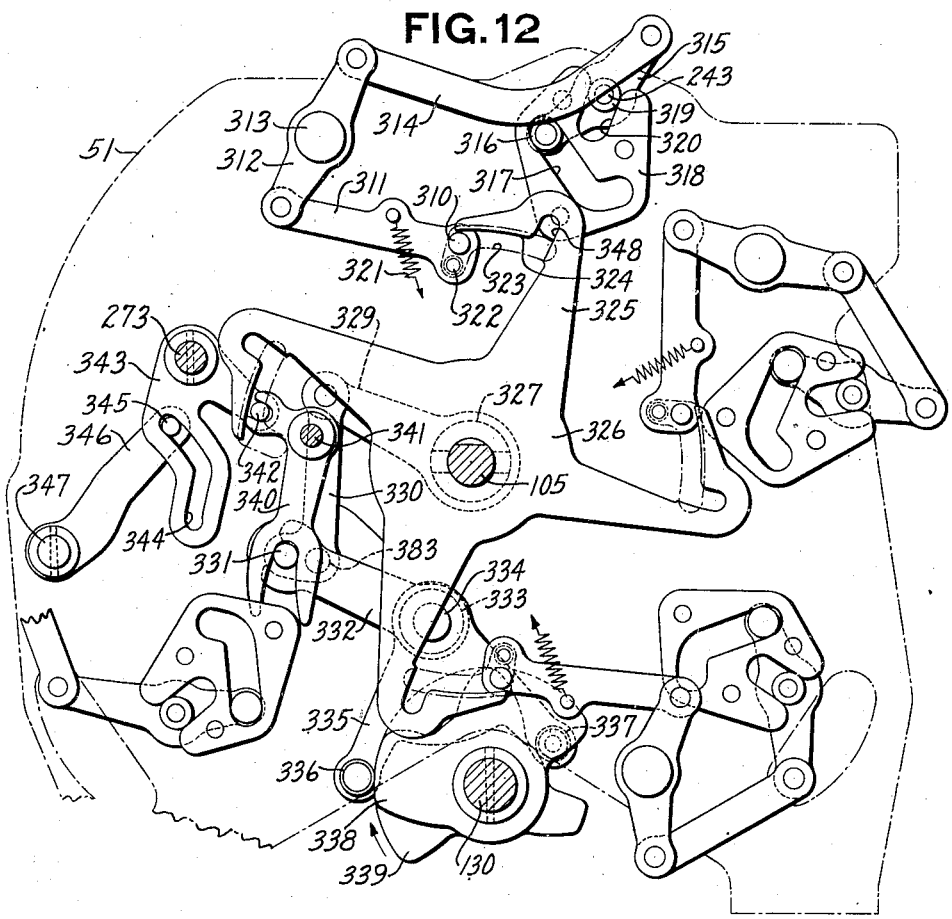

Fig. 12 is a right side elevation showing the mechanism for imparting engaging and disengaging movement to the four totalizer lines.

Figure 13:
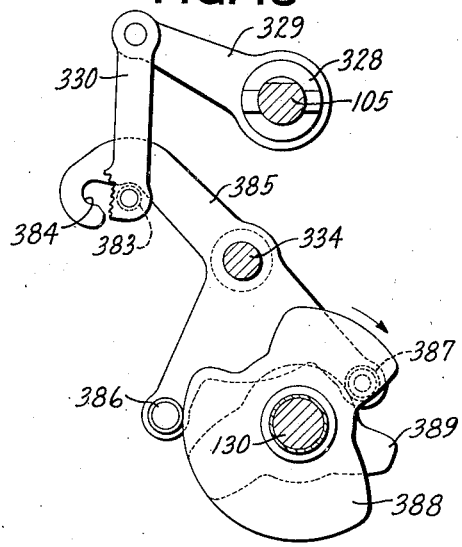

Fig. 13 is a detail view of the cam mechanism for driving the engaging and disengaging mechanism shown in Fig. 12 in total-recording operations.

Figure 14:
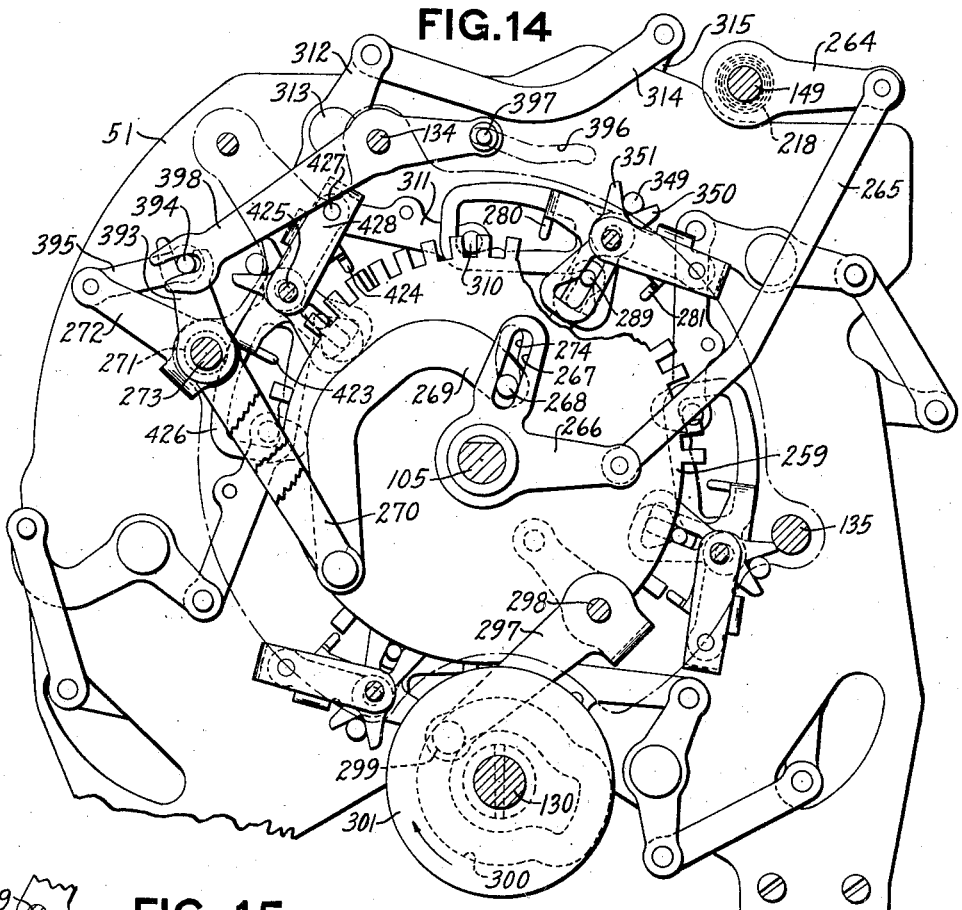

Fig. 14 is a side elevation as observed from the right of the machine, showing in particular the selecting disks controlled by the transaction and total keys and the feeler mechanisms associated therewith.

Figure 15:
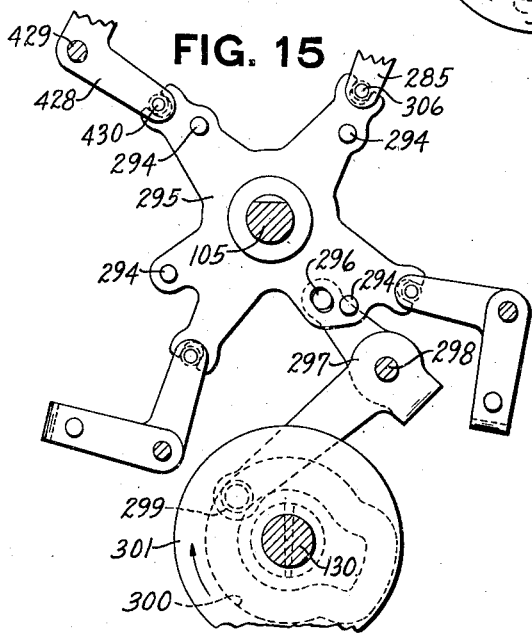

Fig. 15 is a detail view of the mechanism for imparting feeling movement to the feeler mechanisms.

Figure 16:
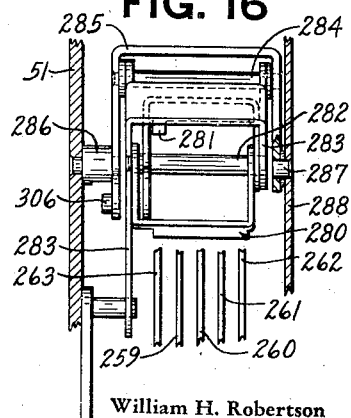

Fig. 16 is a plan view of the feeler mechanism for the #1 row of transaction keys.

Fig. 17 is a right side elevation of the feeler mechanisms and shows in particular the means for disabling the feeler mechanisms in total-recording operations.

Fig. 18 is a perspective view of the feeler mechanism for the #1 row of transaction keys.

Fig. 19 is a detail view of the total selecting disk and a portion of the positioning mechanism associated therewith.

Fig. 20 is a detail view of a portion of the mechanism associated with the transaction differential mechanism shown in Fig. 4, for shifting the #1 totalizer line laterally.

Fig. 21 is a detail view of the aliner for alining the #1 totalizer line in selected positions.

Figure 22:
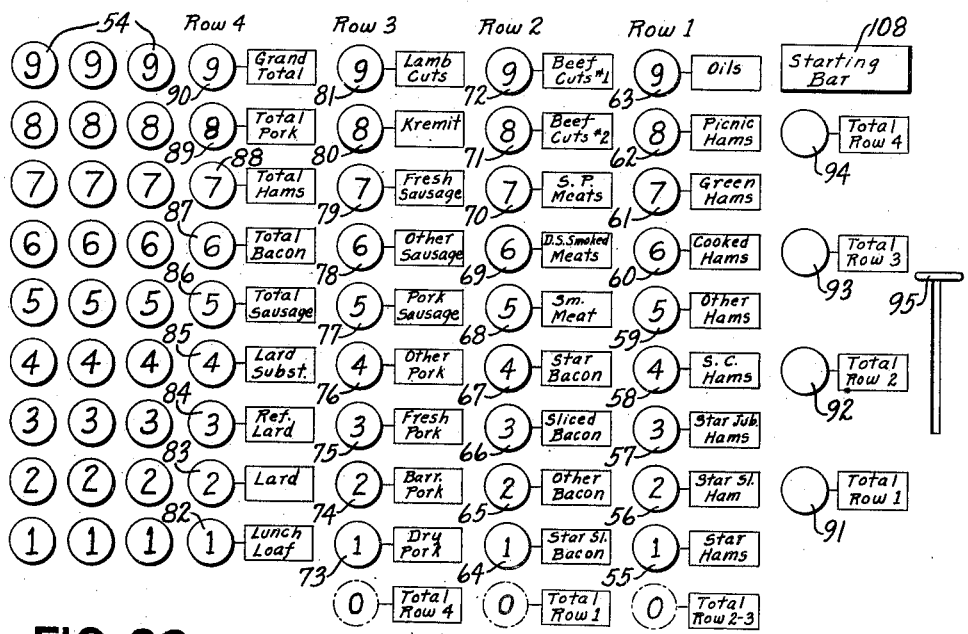

Fig. 22 is a diagrammatic plan view of a portion of the keyboard of the machine embodying the instant invention.

Figs. 23, 24, 25, and 26 are detail views of the selecting disks for the four rows of transaction keys.

Figures 23, 24, 27:
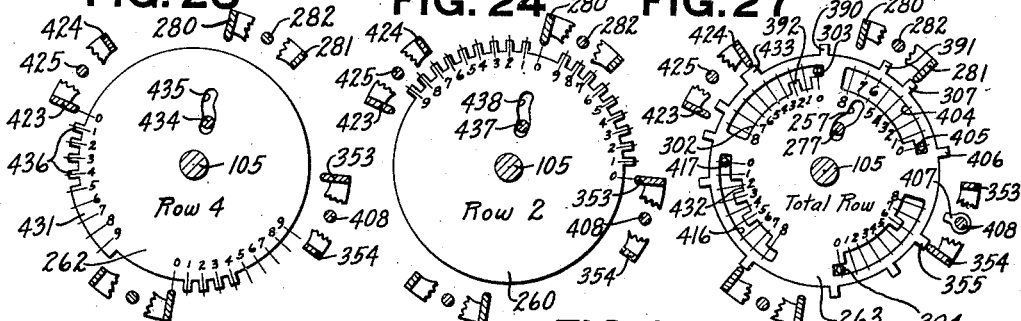

Fig. 27 is a detail view of the selecting disk for the total keys.

Fig. 28 is a time chart giving in graphic form the timing of the important mechanisms of the machine embodying the instant invention.

General Description

The keyboard of the machine embodying the instant invention comprises a plurality of rows of amount keys which in adding operations control the positioning of corresponding amount differential mechanisms, said differential mechanisms in turn being arranged to transmit the values of the depressed amount keys to the printing mechanism and to the wheels of the selected totalizer. In sub-total or total-recording operations, the amount differential mechanisms, which include an amount actuator for each denominational order, are positioned by the wheels of the selected totalizer in accordance with the amount standing on said totalizer wheels, said differential mechanisms in turn transmitting such positioning to the printing mechanism in the usual manner.

Instead of the conventional three lines of totalizers, the present machine is provided with four lines of totalizers, each supporting a maximum of ten sets of interspersed totalizer wheels, which wheels are engageable with the amount actuators of the differential mechanisms for actuation thereby. The four lines of interspersed totalizers are located around the amount actuators, as is the usual custom, and each of said totalizer lines is mounted in a framework which is shiftable laterally to aline the different sets of totalizer wheels with the amount actuators, and is also shiftable radially to engage and disengage the selected set of wheels with and from said actuators.

Four rows of transaction keys, corresponding to the four totalizer lines, are provided for controlling the lateral shifting of the corresponding totalizer frameworks to aline the various sets of totalizer wheels with the amount actuators. The four rows of transaction keys likewise control the positioning of four corresponding add selecting disks, which, in cooperation with their respective feeler mechanisms, control the radial shifting movement of the framework for the corresponding totalizer lines to cause the selected set of totalizer wheels on the selected totalizer line to be engaged with and disengaged from the amount actuators.

The amount differential mechanisms are driven by a main cam shaft, which shaft in adding operations, makes one revolution. In sub-total recording or reading operations, and in total-recording or resetting operations, the main cam shaft makes two such revolutions. Adding operations, which require one revolution of the main cam shaft, are commonly referred to as one-cycle operations, and sub-total and total-recording operations, which require two revolutions of the cam shaft, are commonly referred to as two-cycle operations.

In adding operations, initial movement of the differential mechanisms, under influence of the cam shaft, causes said mechanisms to be positioned under control of the depressed amount keys, and, during this positioning, the framework of the selected totalizer line is shifted laterally, under influence of the depressed transaction keys, to aline the selected set of totalizer wheels thereon with the amount actuators. After the selected set of totalizer wheels has been alined with the amount actuators, the corresponding feeler mechanism, in cooperation with the corresponding selecting disk, which has previously been positioned under influence of the depressed transaction key, causes the totalizer engaging mechanism to be connected to the shiftable framework for the selected totalizer line. Operation of the totalizer engaging mechanism causes the selected set of totalizer wheels to be engaged with the amount actuators after said actuators have been positioned by the amount keys, as explained above, and return movement of said actuators, under influence of the main cam shaft, rotates the selected totalizer wheels in accordance with the values of said depressed amount keys to add in said wheels the amount set up on the keyboard.

The present machine is provided with four total control keys corresponding to the four lines of totalizers, and said keys control the positioning of a corresponding selecting disk which is common to all four totalizer lines and which, in co-operation with the feeler mechanisms for said lines, controls the engaging and disengaging movements of said lines in sub-total and total-recording operations. In sub-total and total-recording operations, the transaction keys are used in conjunction with the total control keys to control the lateral shifting of the totalizer frameworks to select the different sets of totalizers supported thereby for engagement with the amount actuators. The lateral shifting of the totalizer frameworks, under influence of the effective transaction key, occurs during the first revolution of the main cam shaft or during the first cycle of sub-total and total-recording operations, and during this first cycle the amount differential mechanisms are retained in zero position.

Near the end of the first cycle of a total-recording operation, the wheels of the selected totalizer are engaged with the amount actuators, and initial movement of said actuators, during the first part of the second cycle of such operation, rotates said wheels in a reverse direction until a long tooth thereon stops said wheels in zero position. This positions the amount actuators and the printing mechanism in accordance with the amount standing on the selected set of totalizer wheels, and, prior to return movement of said actuators, the framework for the selected totalizer line receives disengaging movement to disengage the selected totalizer wheels from said actuators so that said wheels will remain in a zeroized condition.

The chief difference between a total-recording operation and a sub-total recording operation is that in sub-total recording operations the selected set of totalizer wheels remains in engagement with the amount actuators during their return movement, in the second cycle of such operation, and consequently said wheels are restored to their original positions, after which the totalizer framework receives disengaging movement to disengage said wheels from said actuators.

A novel tens transfer mechanism, which functions in adding operations, is provided for transferring tens digits from lower to higher denominations. In adding operations, when the wheels of the selected totalizer pass from 9 to 0 while being rotated in an additive direction by the amount actuators, a long tooth on said wheels trips the transfer mechanism for the next higher order. After the amount actuators have completed their return movement, the framework for the selected totalizer line receives an auxiliary lateral shifting movement to move the selected set of totalizer wheels out of alinement with the amount actuators and into alinement with a series of transfer segments which are located adjacent to the corresponding amount actuators, there being one such transfer segment in each denominational order of each of the four totalizer lines except the lowest order. After the selected totalizer wheels are engaged with the transfer segments, said segments are released to the driving action of their springs, to cause the tripped segments to advance the wheels of the next higher order one digit, to effect a tens transfer.

The selected set of totalizer wheels remains in alinement with the transfer segments at the end of the machine operation and are shifted back into alinement with the amount actuators at the beginning of the succeeding operation, at which time all the previously tripped transfer segments are restored to untripped position.

A manually positionable control lever, which is movable to three positions — namely, "add," "read," and "reset"—is provided for controlling the various functions of the machine. When the total control lever is in adding position, it functions in conjunction with the four rows of transaction keys to cause the framework for the selected totalizer line to be shifted radially in adding time. When the control lever is moved to "read" position, it functions in cooperation with the transaction keys and the four total control keys to cause the framework for the selected totalizer line to be shifted radially in sub-total or reading time. When the total lever is moved to "reset" position, it functions in conjunction with the transaction keys and the four total control keys to cause the framework for the selected totalizer line to be shifted radially in total or reset time.

One of the novel features of the machine embodying the present invention is that it is arranged to transfer totals from one set of totalizers to another, and said machine is presently constructed to transfer totals into certain of the sets of totalizer wheels on the #4 totalizer line from certain of the sets of totalizer wheels on any of the other three totalizer lines. However, this system of transferring totals is simply a matter of choice, as the machine may be arranged to transfer totals into the sets of totalizer wheels on any of the other totalizer lines by the simple expedient of properly altering the selecting disks. Also, the machine is presently arranged to transfer totals only in total-recording or resetting operations, and this likewise is a matter of choice.

The first part of a transfer total operation is the same as any total-recording or resetting operation; that is, in the first cycle of such operation, the amount actuators are retained in zero position, and the framework for the totalizer line corresponding to the depressed transaction key and the depressed total control key is shifted laterally to aline the set of wheels on said line corresponding to said depressed transaction key with said amount actuators. Near the end of the first cycle of transfer total operations, the set of wheels selected for clearing is engaged with the amount actuators, and initial movement of said actuators, during the second cycle of such operation, reversely rotates said selected wheels to zero in the manner explained in connection with total and sub-total recording operations. Near the end of the first cycle of transfer total operations, and after the totalizer set from which the total is to be cleared has been selected, the selecting disks are given an auxiliary movement, which places them in new positions. Said disks then, in cooperation with the feeler mechanisms, cause the totalizer set on the #4 totalizer line corresponding to the depressed transaction key in the fourth transaction row to be engaged with the amount actuators after said actuators have been positioned by the wheels of the totalizer set from which the total is being transferred, as explained above. Return movement of the amount actuators, near the end of the second cycle of the transfer total operation, causes the amount cleared from the selected set of totalizer wheels on the Nos. 1, 2, or 3 totalizer lines to be added into or transferred to the selected set of wheels on the #4 totalizer line.

In sub-total recording or reading operations, the mechanism for selecting the totalizers on the #4 totalizer line for the transferring of totals is rendered inoperative.

In the ensuing detailed description, mechanism pertinent to the instant invention will be described in detail. However, mechanism of a standard nature, which has become fully established in the art, will be but briefly described, as reference may be had to the aforementioned patents for a full disclosure of this standard mechanism.

DETAILED DESCRIPTION

Framework and operating mechanism

The machine embodying the instant invention has right and left main frames 50, only the right frame here shown (Figs. 1, 5, 12, and 14), and right and left sub-frames 51, only the right sub-frame here shown, said frames being secured to a machine base 52, which, together with various cross frames, bars, and rods, holds the frames 50 and 51 in fixed relationship to each other. The mechanism of the machine is enclosed in a suitable cabinet or case 53 (Figs. 1 and 2), which is in turn secured to the machine base 52. The cabinet 53 is provided with suitable closures, through which access may be had to the important mechanisms of the machine. If desired, these closures may be provided with locks to prevent unauthorized persons from having access to said important mechanisms.

Under normal conditions, the machine is operated by an electric motor of conventional design, such as those used in previous machines of this type, said motor being released for operation by the use of the usual starting bar 108, located on the right-hand side of the machine. In addition to the electric motor, a hand crank (not shown) is provided for operating the machine manually when there is a failure in the electric current or when such current is not available.

Keyboard

By referring to Fig. 22, which is a diagrammatic view of the keyboard of the machine of this invention, it will be seen that the keyboard comprises a plurality of rows of amount keys 54 (only three rows here shown) for controlling the positioning of the corresponding amount actuators in adding operations, four rows of transaction keys numbered 55 to 90 inclusive for controlling the selection of the different totalizers on the four totalizer lines, and four total control keys 91 to 94 inclusive for use in conjunction with the transaction keys for controlling the selection and the engaging and disengaging movements of the four totalizer lines in sub-total recording or reading and total-recording or resetting operations.

A total control lever 95 (Figs. 1 and 22), which is manually positionable to three positions—namely, "add," "read," and "reset"—is provided for controlling the add, read, and reset functions of the machine. A key 96 is used for operating a cylinder type lock mounted in the total control lever 95, said lock having a projection 97, which, in cooperation with three notches 98 corresponding to the three positions of said total control lever 95, locks said lever in any of its positions. The notches 98 are in a segmental plate 99 secured to the main frame 50.

An extension 106 (Fig. 1) of the total control lever 95 has therein three V-shaped alining notches corresponding to the three positions of said lever, which notches, in cooperation with a spring-pulled alining pawl 107, yieldingly retain said lever 95 in any of its three positions.

Amount differentials

Figure 2:
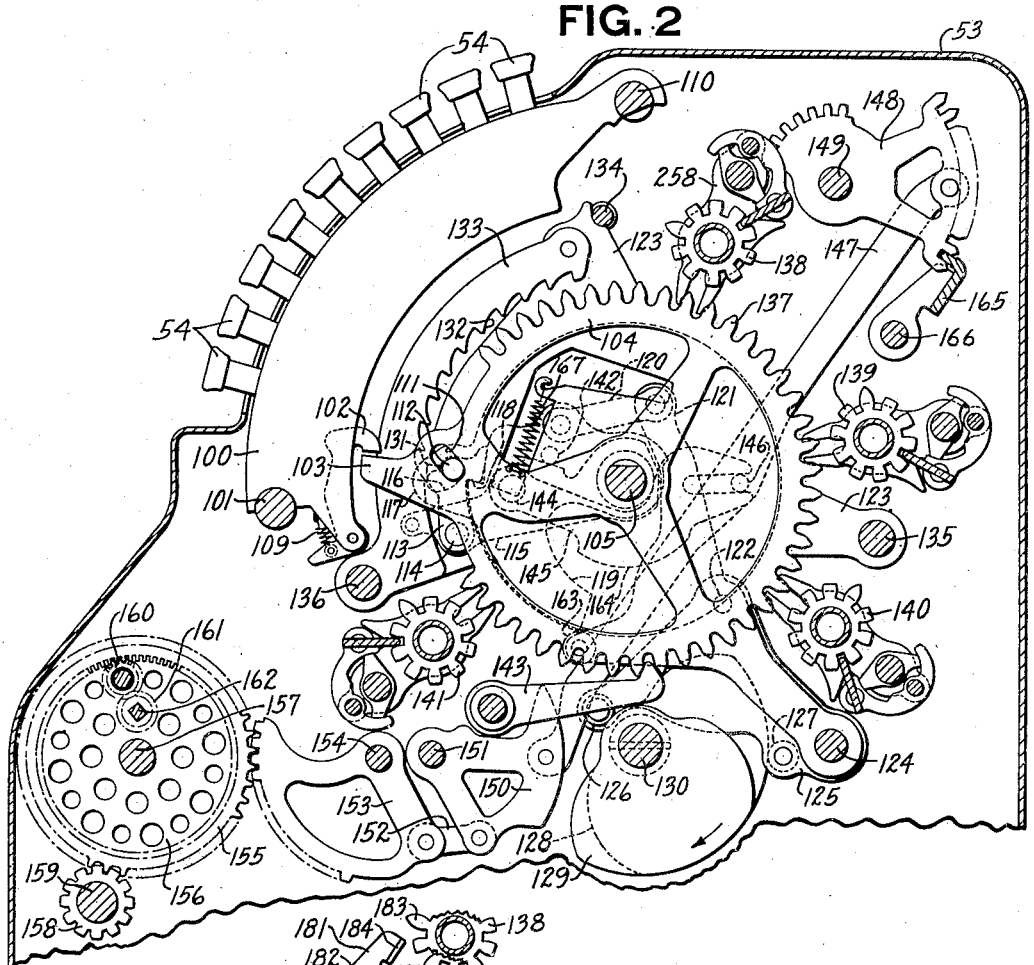
Fig. 2 is a cross-sectional view taken just to the right of one of the amount banks and showing the differential mechanism associated with said amount bank, and the four totalizer lines.

As previously explained, the amount keys 54 (Figs. 2, 5, and 22) control the positioning of corresponding amount differential or actuator mechanisms, and, inasmuch as this differential mechanism is substantially duplicated in each denominational order, it is believed that a description of the mechanism of one such denominational order, as shown in Fig. 2, will be sufficient for the purpose of this specification.

The amount keys 54 (Fig. 2) of the denominational row here shown, which is representative of all the rows of amount keys, are mounted in a framework 100 supported by rods 101 and 110 in turn supported by the main framework of the machine. Depression of any one of the amount keys 54 rocks a zero stop pawl 102 counter-clockwise out of the path of a projection 103 of an amount actuator 104 free on a shaft 105 journaled in the main frames 50, and moves the lower end of said depressed key into the path of said projection 103. When no amount key 54 is depressed, the zero stop pawl 102, under influence of a spring 109, is retained in the path of the projection 103 and breaks the latch for this amount bank in zero position, as will be explained later.

The actuator 104 (Fig. 2) has therein an angular camming slot 111, through which extends a stud 112 in a latch 113 pivoted on a stud 114 carried by a latch arm 115 free on the shaft 105. The stud 112 also extends through an angular camming slot 116, which is a companion slot to the slot 111, said slot 116 being in a differential balance plate 117 free on the shaft 105. A foot-shaped extension of the latch 113 has thereon a shoulder 118, which, in cooperation with a similar shoulder on a latch driving segment 119 free on the shaft 105, forms a driving connection between said segment and the latch arm 115. A link 120 operatively connects the driving segment 119 to an operating lever 121 pivoted on a stud 122 in a partition plate 123 for this particular amount bank, there being such a partition plate for each amount bank.

A boring in a downward extension of the lever 121 freely engages a rod 124, opposite ends of which are secured in similar arms 125 (only the left-hand arm being shown here), said arms being pivoted on studs (not shown) similar to and in axial alinement with the stud 122, said studs being secured in their corresponding partition plates 123. Each of the arms 125 carries a set of rollers 126 and 127, which cooperate, respectively, with their corresponding set of companion plate cams 128 and 129 (only one set here shown), secured on a main cam shaft 130 journaled in the main framework of the machine.

A clutch mechanism, not here shown but well known in the art, operatively connects the main cam shaft 130 to the operating motor, said motor, as previously explained, arranged to drive the shaft 130 one clockwise revolution in adding operations and two such revolutions in reading and resetting operations. Revolution of the main cam shaft 130, by means of the cams 128 and 129, imparts an invariable oscillating movement to the arms 125, the lever 121, and the latch-operating segment 119, first clockwise and then counterclockwise, according to the time given in space 1 of the time chart, Fig. 28.

Initial movement clockwise of the segment 119, by means of the shoulder thereon in cooperation with the shoulder 118 on the latch 113, carries said latch and the latch arm 115 clockwise in unison therewith. The latch 113, by means of the stud 112 in cooperation with the slots 111 and 116, carries the actuator 104 and the balance plate 117 clockwise in unison therewith. In this case, a spring 167 and the downward inertia of the balance plate 117 cause the slot 116, in cooperation with the stud 112, to retain the latch in engagement with the segment 119 and thereby overcome any tendency of the slot 111 in the actuator 104 to cam said latch 113 out of engagement with the shoulder on the operating segment 119. The actuator 104 moves in unison with the segment 119 until the projection 103 engages the lower end of the stem of the depressed key 54, which obstructs further clockwise movement of said actuator 104. Stopping of the actuator 104 causes the cam slot 111, in cooperation with the stud 112, to cam the latch 113 counter-clockwise to disengage the shoulder 118 from the segment 119 and simultaneously to engage an arcuate surface 131 on the top of said latch with the corresponding one of a series of alining notches 132 in a curved alining bar 133 secured to the partition plate 123 for this particular amount bank, said plate 123 being supported by the shaft 105 and the rods 134, 135, and 136, in turn supported by the main framework of the machine. As the segment 119 continues its clockwise movement without interruption, an arcuate surface thereon passes in the path of the foot-shaped extension of the latch 113 to lock said latch, the arm 115, and the actuator 104 in set positions.

The actuator 104 has, on the periphery thereof, a plurality of gear teeth 137 arranged to cooperate with the different sets of totalizer wheels 138 to 141 inclusive, carried respectively by the Nos. 1, 2, 3, and 4 totalizer lines.

In adding operations, after the actuator 104 has been positioned, as explained above, the selected totalizer line is shifted radially to engage the corresponding one of the selected set of totalizer wheels thereon with the teeth 137 of the actuator 104. After the corresponding one of the selected set of totalizer wheels has been engaged with the actuator 104, return movement counter-clockwise of the operating segment 119 moves the arcuate surface on said segment beyond the foot-shaped extension of the latch 113 and simultaneously causes a stud 142 carried thereby to engage a raised surface on the latch arm 115 to return said arm and, through the stud 112 and the slots 111 and 116, the actuator 104 and the balance plate 117 counter-clockwise in unison therewith. Counter-clockwise movement of the latch arm 115 causes the alining notch 132, in cooperation with the arcuate surface 131 and the spring 167, to reengage the shoulder 118 on said latch 113 with the corresponding shoulder on the operating segment 119. During its return movement counter-clockwise, the actuator 104 rotates the wheel 138 of the selected totalizer in an additive direction, in accordance with the value of the depressed amount key 54, to add said value into said wheel.

In reading or resetting operations, the main cam shaft 130 (Fig. 2) receives two clockwise revolutions, and during the first such revolution the zero stop pawl 102 remains in the path of the projection 103 to break the latch 113 in zero position in the well-known manner. Also during the first revolution of the shaft 130, the selected totalizer line is shifted laterally to aline the corresponding one of the selected set of wheels thereon with the actuator 104, as will be explained later. After the selected totalizer wheel has been alined with the actuator 104, the totalizer line is shifted radially or inwardly to engage said wheel with said actuator 104 prior to its initial movement clockwise, which movement reversely rotates said wheel until a long tooth thereon comes into contact with a stop which locates said wheel in zero position and positions the actuator 104 in accordance with the amount standing on said wheel.

In resetting or total-recording operations, the selected totalizer wheel is disengaged from the actuator 104 prior to its return movement counter-clockwise, and consequently said wheel remains in a zeroized condition. In reading or sub-total recording operations, the selected totalizer wheel remains in engagement with the actuator 104 during its return movement counter-clockwise and consequently is restored to its original position.

An aliner 143 (Fig. 2), in cooperation with the teeth 137, retains the actuator 104 in set position in all types of operations. Obviously the aliner 143 is disengaged while the actuator 104 is being positioned.

The differential positioning of the actuator 104, under influence of the amount keys 54 in adding operations, and under influence of the corresponding totalizer wheel in reading and resetting operations, is transmitted to the printing mechanism by the well-known beam mechanism, which will now be described.

The latch arm 115 carries a stud 144 upon which is pivoted a beam 145 having a slot in the rearward end thereof, which cooperates with a stud 146 in a link 147, the upper end of which is pivotally connected to a gear sector 148 free on a shaft 149 journaled in the machine framework. The lower end of the link 147 is pivoted to a segment 150 free on a shaft 151 journaled in the main framework, and said segment 150 is operatively connected by a link 152 to a companion gear sector 153 free on a shaft 154 also journaled in the main framework. The gear sector 153 meshes with the external teeth of an external-internal printer drive gear 155, the internal teeth of which bear on the periphery of a disk 156 fast on a shaft 157 supported by the printer framework. The external teeth of the gear 155 mesh with and drive a type wheel 158 for this particular denomination, said type wheel being free on a shaft 159 journaled in the printer framework. The internal teeth of the gear 155 mesh with a pinion 160 (Fig. 2) in turn meshing with a similar pinion 161 on a square shaft 162 journaled in borings in the disks 156, said shaft 162 being operatively connected, by a similar gearing, to other type wheels for this particular order, said type wheels adapted to print in the various columns of multi-column record material.

The internal-external gear mechanism for driving type wheels is fully disclosed in United States Patent No. 1,693,279, issued November 27, 1928, to Walter J. Kreider, to which reference may be had for a more complete description thereof.

When the lever 121 (Fig. 2) nears the terminus of its initial movement clockwise, a roller 163 carried thereby engages a rounded surface 164 on the lower edge of the beam 145 and forces an in-curved surface on the upper edge thereof into engagement with a bushing on the shaft 105, to cause said beam, through the medium of the link 147, to position the sector 148, the segment 150, and the sector 153 in accordance with the value of the depressed amount key in adding operations, and in accordance with the amount on the selected totalizer wheel in reading and/or resetting operations. The sector 153, through the medium of the external-internal gear 155, positions the type wheel 158 in accordance with the positioning of the actuator 104. An aliner 165, secured on a shaft 166 journaled in the main framework of the machine, cooperates with alining teeth on the gear sector 148 to aline said sector and the mechanism connected thereto by the link 147 in set positions.

Transfer mechanism

A tens transfer mechanism is provided for transferring tens digits from lower to higher denominations. The transfer mechanism for each totalizer line comprises a transfer segment and its associated tripping mechanism for each denominational order, except the lowest order, and, when a totalizer wheel passes from 9 to 0 while traveling in an additive direction, the long tooth thereon trips the transfer mechanism for the next higher order. The transfer segments are located adjacent to and parallel with the corresponding amount actuators; therefore, after the amount actuators have completed their return movements, to enter the value of the amount set up on the amount keys in the selected totalizer wheels, it is necessary to shift the selected totalizer line or lines a slight distance laterally to aline said wheels with the corresponding transfer segments. Immediately thereafter, the previously tripped transfer segments function to add one in the totalizer wheels of the next higher orders.

During the auxiliary shifting of the totalizer line to move the selected totalizer wheels into alinement with the transfer segments, said line is partially disengaged to insure that said wheels do not stumble on the transfer segments and to insure that adjacent wheels do not stumble on the teeth of the actuators. The selected totalizer wheels remain in engagement with the transfer segments at the end of machine operation and are disengaged therefrom immediately at the beginning of the succeeding operation, after which the totalizer line is restored laterally to aline the wheels thereof with the amount actuators.

Inasmuch as the transfer mechanisms for the different denominational orders and for the different lines of totalizers are identical, it is believed that a description of the transfer mechanism for the denominational order of the #1 totalizer line, shown in Fig. 2, will suffice.

The transfer mechanism for the denominational order of the #1 totalizer line, shown in Fig. 2, comprises a transfer segment 170 (Fig. 3) pivoted on a stud 171 in a plate 172 supported by the rods 134, 135, and 136. A spring 173 urges the segment 170 counter-clockwise to normally maintain a camming surface 174 thereon in engagement with a stud 175 in a transfer operating arm 176 free on a stud 177 in the plate 172. A spring 178 urges the arm 176 clockwise to normally maintain a bent-over ear 179 thereon in contact with a retaining tooth 180 on a transfer trip yoke 181 free on a stud 182 in the plate 172 for the order here shown.

Figure 3:
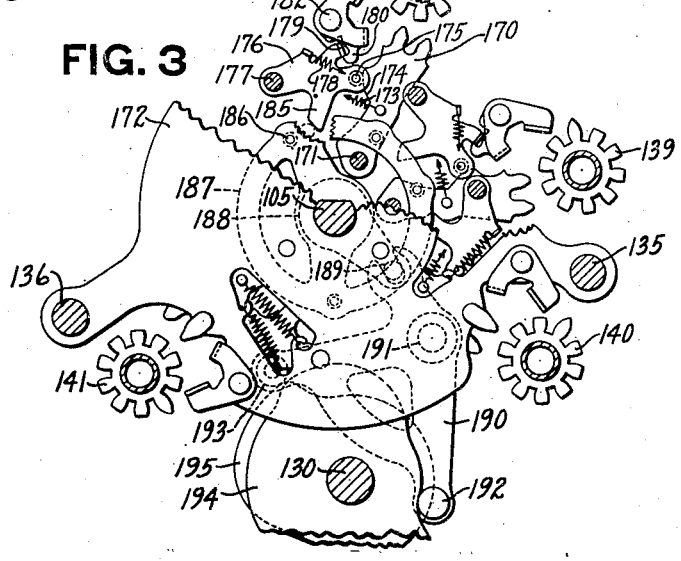
Fig. 3 is a detail view of the tens transfer mechanism for the amount bank shown in Fig. 2.

When the selected #1 totalizer wheel 138, in the next lower order to the order shown in Figs. 2 and 3, passes through zero, a long tooth 183 thereon engages a bent-over extension 184 on the yoke 181 and rocks said yoke counter-clockwise to disengage the tooth 180 from the ear 179 to release the arm 176 to the action of the spring 178, which rocks said arm a slight distance clockwise until the ear 179 passes beyond the tooth 180 and until a depending finger 185 of said arm 176 contacts a stud 186, which at this time is in the position here shown in dot-and-dash lines. The stud 166 is secured in a restoring disk 187 fast on the shaft 105, there being such a disk for each denominational order, with the exception of the lowest order. Also fast on the shaft 105 (Fig. 3) is a crank 188 carrying a stud 189 embraced by a slot in a cam lever 190 free on a stationary stud 191. Angularly disposed arms of the lever 190 carry, respectively, rollers 192 and 193, which cooperate respectively with the peripheries of companion plate cams 194 and 195 secured on the main cam shaft 130.

The timing of the cams 194 and 195 is given in space 3 of the time chart, Fig. 28, from which it will be seen that initial movement of said cams, through the lever 190, rocks the disk 187 clockwise, causing the stud 186, in cooperation with the depending finger 185, to restore the operating arm 176 counter-clockwise against the action of its spring 178 until the ear 179 passes beyond the tooth 180. Continued rotation of the cams 194 and 195 returns the disk 187 and the stud 186 a slight distance counter-clockwise to permit the ear 179 to engage the tooth 180 to latch the transfer mechanism in untripped position, and to position the stud 186 a slight distance away from the finger 185, as shown in dot-and-dash lines in Fig. 3. Restoring movement counter-clockwise of the operating arm 176 causes the stud 175, in cooperation with the camming surface 174, to restore the tripping segment 170 clockwise against the action of the spring 173.

It will be noted that the restoring of the transfer mechanism takes place during initial movement of the amount actuators 104 and prior to the time the selected totalizer wheels are engaged therewith. Return movement of the amount actuator for the next lower order wheel 138 (Fig. 3) rotates said wheel in an additive or clockwise direction, causing the long tooth 183 thereon to engage the extension 184 to trip the yoke 181, in the manner explained above. After the amount actuator has completed its return movement, the transfer shift is imparted to the #1 totalizer line to move the wheels 138 of the selected totalizer into alinement with the transfer segments 170, and immediately thereafter the cams 194 and 195 return the disk 187 counter-clockwise to the position shown here. The operating arm 176 moves clockwise in unison with the disk 187, causing the stud 175, in cooperation with the camming surface 174, to permit the spring 173 to rock the segment counter-clockwise to advance the totalizer wheel 138, for the order here shown, one digit to effect a tens transfer.

The mechanism for imparting auxiliary or transfer shifting movement to the totalizer line will be explained later herein in connection with the totalizer selecting and engaging mechanism.

In reading and resetting operations, the wheel 138 (Fig. 3) is reversely rotated by the amount actuator 104, in the manner explained above, until the long tooth 183 thereon comes in contact with the extension 184 to locate said wheel

Transaction keys and differential mechanism therefor

The differential mechanism for each of the four rows of transaction keys is similar in every respect to the amount differential mechanism shown in Fig. 2 and explained above, and, as the transaction differential mechanism is substantially duplicated for each row of transaction keys, it is believed that a description of the differential mechanism for the first row of transaction keys, shown in Fig. 4, will suffice for all.

The transaction keys 55 to 63 for the first transaction bank are mounted in a key frame 198 supported by the rods 101 and 110 in exactly the same manner as the amount key banks. Depression of any one of the transaction keys 55 to 63 rocks a zero stop pawl 199 counter-clockwise out of the path of a projection 200 of an actuator 201 free on the shaft 105, said actuator 201 being operatively connected to a balance plate 202 by means of angular slots in said actuator and said plate, in cooperation with a stud in a latch 203 pivotally mounted on a latch arm 204 free on the shaft 105. The latch 203 cooperates with a shoulder on a differential operating segment 205 free on the shaft 105 and connected by a link 206 to an operating lever 207 free on a stationary stud 208. The cam lever 207 carries rollers 209 and 210, which cooperate, respectively, with the peripheries of companion plate cams 211 and 212 secured on the main cam shaft 130. The cams 211 and 212 function according to the time given in space 1 of the time chart (Fig. 28) to rock the actuator 201 first clockwise and back to normal position during each revolution of said main shaft 130.

The parts of the transaction differential described briefly above are similar to and function exactly like similar parts of the amount actuator shown in Fig. 2 and described earlier herein.

Initial movement clockwise of the lever 207, through the segment 205 and the latch 203, carries the actuator 201 clockwise in unison therewith until the projection 200 contacts the stem of the depressed transaction key, which positions said actuator according to the value of said depressed transaction key. This disengages the latch 203 from the segment 205 in exactly the same manner as described for the amount bank, thus permitting said segment and the lever 207 to complete their initial movements clockwise independently thereof. When the lever 207 nears the terminus of its initial movement clockwise, a roller 213 carried thereby engages an arcuate surface on a beam 214 pivoted on the arm 204, to position said beam in accordance with the depressed transaction key. The rearward end of the beam 214 is bifurcated to embrace a stud 215 in a link 216, the upper end of which link is pivotally connected to a gear sector 217 secured to one of a plurality of nested tubes 218 free on the shaft 149. The lower end of the link 216 is pivotally connected to a segment 219 free on the shaft 151, and connected by a sleeve 220 to a crank 221. The crank 221 (Figs. 4, 5, and 20) is connected by a link 222 to a segment 223 free on the shaft 105, said segment meshing with a gear 224 secured on a short shaft 225 journaled in plates 226 and 227 supported by the rods 134, 135, and 136 (Fig. 2).

Also secured on the shaft 225 (Figs. 5 and 20) is a disk 228 carrying three studs 229 which freely engage corresponding borings in the left-hand face of a drum cam 230 free on the shaft 225. The cam 230 has a helical cam groove 231 which cooperates with a roller 232 secured in a slide 233 shiftably mounted on the top surface of a yoke 234 by means of studs in said slide in cooperation with horizontal slots in said yoke, said roller 232 arranged to extend through one of said horizontal slots. The yoke 234 is free on the shaft 225, but is held against rotary movement by a roller 235 carried thereby, in cooperation with a horizontal slot in a bracket 236 secured to the plate 226, and by means of a vertical slot in the left-hand extension thereof, in cooperation with a stud 237 in the plate 227. An annular groove 238 (Fig. 5) in a reduced portion of the drum cam 230, in cooperation with a slotted bracket 239 secured to the yoke 234, maintains said drum cam and said yoke in fixed lateral relationship to each other.

An upturned portion of the slide 233 (Figs. 5 and 20) has therein a slot 240 which engages an annular groove 241 in a hub portion of a totalizer frame side member 242, said hub portion having therein a boring which freely engages a shaft 243 which is arranged to be shifted radially in a manner presently to be described to engage the selected set of totalizer wheels with the amount actuators. The side member 242 supports the right-hand end of the #1 totalizer line or rod, while a similar side member 258 (Fig. 2), also slidably mounted on the shaft 243, supports the left-hand end of said #1 totalizer line, said side members, together with the #1 totalizer line and the shaft 243, forming a shiftable framework for engaging and disengaging the #1 totalizer wheels with and from the amount actuators. The lower ends of the side members 242 and 258 have therein similar slots which engage similar tooth-shaped blocks 244 carried by the plates 123, said blocks being the shape of and in alinement with the teeth in the actuators 104 (Fig. 2).

The roller 235 (Figs. 5, 6, and 7) extends into a cam groove 1244 in one of four camming extensions on a transfer shift cam 245 free on the shaft 105. An extension 246 of the cam 245 has pivotally connected thereto the upper end of a link 247 having a stud 249 in the lower end, which normally engages a slot in an arm 248 fixedly connected, by a hub free on a stud 250 in the plate 226, to a cam arm 251. The cam arm 251 carries rollers 252 and 253, which cooperate respectively with the peripheries of companion plate cams 254 and 255 secured on the main cam shaft 130.

The timing of the cams 254 and 255 is given in space 2 of the time chart, Fig. 28, and by comparing the timing of these cams with that of the cams 128 and 129 (space 1, Fig. 28) it will be seen that the arms 251 and 248 and the cam 245 (Figs. 5 and 6) are shifted clockwise prior to initial movement of the amount actuators 104. Clockwise movement of the cam 245, by means of the groove 1244 in cooperation with the roller 235, shifts the yoke 234 toward the left, as viewed in Fig. 5, which movement is transmitted by the bracket 239 to the drum cam 230 and thence by the cam groove 231 and the roller 232 to the slide 233. This shifts the member 242 and the #1 totalizer framework a slight distance toward the left to move the selected totalizer wheels out of alinement with the transfer segments 170 and into alinement with the amount actuators 104 (see also Figs. 2 and 3).

After the selected set of wheels on the #1 totalizer has been shifted out of alinement with the transfer segments, as explained above, the roller 213 (Fig. 4) engages the beam 214 to position said beam in accordance with the depressed transaction key, and this positioning is transmitted by the link 216 to the sector 217, the segment 219, and the crank 221. The crank 221, by means of the link 222, rocks the gear segment 223 from zero position, as here shown, in a clockwise direction to a position corresponding to the depressed transaction key. Clockwise movement of the segment 223 (Figs. 4 and 5) rotates the gear 224, the shaft 225, and the drum cam 230 counter-clockwise, causing the cam groove 231 in said drum cam, in cooperation with the roller 232, to shift the slide 233 and the totalizer framework, comprising the members 242 and 258 and the #1 totalizer line, toward the left, as here viewed, to aline the set of totalizer wheels 138 corresponding to the depressed transaction key 55 to 63 with the amount actuators 104.

In adding operations, after the selected set of totalizer wheels has thus been alined with the amount actuators, radial shifting movement is imparted to the shaft 243 (Figs. 2 and 5), as will be presently explained, to engage the selected totalizer wheels with the amount actuators 104, after said actuators have been positioned under influence of the depressed amount keys. Return movement counter-clockwise of said actuators rotates said wheels in an additive direction to enter the amount therein, and, after said actuators have completed their return movements, the totalizer wheels are slightly disengaged from the actuators, and the cams 254 and 255 (Figs. 5 and 6 and space 2 of the time chart, Fig. 28) function to shift the #1 totalizer a slight distance to the right to move the selected set of wheels thereon into alinement with the transfer segments 170. After this, the #1 totalizer line is returned to full engaged position and the tripped transfer segments 170 (Fig. 3) then function, under influence of their cams 194 and 195 (space 3, Fig. 28), to effect the transfer of tens digits from lower to higher denominations, in the manner explained earlier herein.

At the end of a machine operation, the selected set of totalizer wheels remains in alinement with the transfer segments 170 and is returned into alinement with the amount actuators 104 at the beginning of the succeeding operation.

In reading and/or resetting operations, the mechanism for the #1 transaction bank, shown in Fig. 4 and explained above, functions exactly the same as in adding operations, to aline the selected set of totalizer wheels with the amount actuators during the first cycle of said reading and/or resetting operations. However, the engaging movement of the #1 totalizer line is different, in that the selected totalizer wheels thereon remain in engagement with the amount actuators at the beginning of the second cycle of such operations, and said actuators, in their initial movement, reversely rotate the selected totalizer wheels to zero, in the manner explained previously.

The other three totalizer lines are shifted laterally, for the selection of the different sets of totalizer wheels thereon and for the transfer of tens digits, by mechanism similar to and functioning in exactly the same manner as the mechanism for the #1 totalizer line.

Totalizer line selecting and engaging mechanisms

The differential mechanisms for the four rows of transaction keys (Fig. 22), in addition to selecting the sets of totalizer wheels corresponding to said keys for engagement with the amount actuators, likewise control the positioning of corresponding selecting disks 259 to 262 inclusive (Figs. 23 to 26), which disks, in cooperation with their feeler mechanisms, control the selection of the corresponding totalizer lines for engaging and disengaging movement and also control the selection of other totalizer lines, having a set of group total wheels in the zero positions thereof, for engaging and disengaging movement, so that a group total of the items being entered in the different transaction rows may be obtained.

Likewise, the four total keys 91 to 94 (Fig. 22) have a differential mechanism similar to that explained in connection with the #1 row of transaction keys, which differential mechanism, in reading and resetting operations, controls the positioning of a corresponding selecting disk 263 (Fig. 27), which, in cooperation with the feeler mechanisms, causes the totalizer line corresponding to the depressed total key to be selected for engaging and disengaging movement. In resetting operations, the disk 263 and associated mechanism cause the #4 totalizer line to receive engaging and disengaging movement in adding time, as will be explained later, to cause the totals being cleared from the totalizers on the #1, #2, or #3 totalizer lines to be transferred to the sets of wheels on said #4 totalizer line corresponding to the depressed transaction keys 86 to 89.

Referring now to Fig. 4, positioning of the sector 217 by the differential mechanism for the first row of transaction keys is transmitted by the tube 218 to a crank 264 (Figs. 5 and 14), which crank is secured on the right-hand end of said tube. A link 265 connects the crank 264 to a bell crank 266 free on the shaft 105, and said bell crank has a slot 267 through which extends a stud 268 in one end of a link 269, the other end of which link is pivotally connected to an arm 270 secured to a sleeve 271 in turn secured in the arms of a yoked member 272, said sleeve 271 being free on a shaft 273 journaled in the machine framework. The stud 268 extends through the link 269 and into a camming slot 274 in the selecting disk 259 for the first transaction bank, and said stud forms a driving medium between the bell crank 266 and said selecting disk.

The stud 268 remains in the position shown in Fig. 14 in adding and reading operations; however, in resetting operations, said stud is shifted upwardly, in a manner to be described later, to impart an auxiliary movement to the selecting disk 259 for the transferring of totals.

Figures 25, 26:
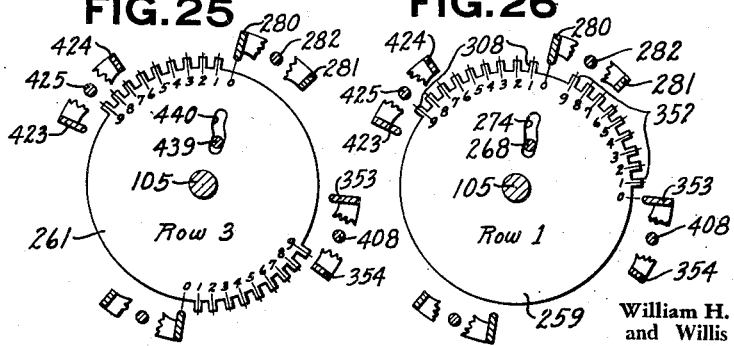

The tube 218, the crank 264, the link 265, the bell crank 266, and the stud 268 form an operating connection between the first transaction bank differential mechanism and the selecting disk 259. Consequently, said disk is positioned in accordance with the depressed transaction key. A similar mechanism is provided for transmitting the positioning of the differential mechanisms for the second, third, and fourth rows of transaction keys to their corresponding selecting disks 260, 261, and 262 (Figs. 23, 24, and 25). Likewise, a similar mechanism is provided for transmitting the positioning of the differential mechanism for the total keys 91 to 94 (Fig. 22) to the total selecting disk 263, said mechanism including one of the tubes 218 (Figs. 5 and 19) and its integral crank 256. A link 275 connects the crank 256 to a bell crank 276 free on the shaft 105 and having a slot engaged by a stud 277 in one end of a link 278, the other end of which link is connected to an arm 279 secured to the sleeve 271. The stud 277 also engages a slot 257 in the total selecting disk 263. The parts described above for positioning the total selecting disk 263 are similar to and function exactly like the corresponding parts for the first transaction bank, shown in Fig. 14 and described earlier. As previously explained, in adding operations the differential mechanism for the total keys 91 to 94 (Fig. 22) remains in zero position and, when in said position, locates the total selecting disk 263 as shown in Figs. 19 and 27.

In adding operations, after the transaction selecting disks have been positioned under influence of the transaction keys, the feeler mechanism functions to select the totalizer line corresponding to the depressed transaction key for engaging and disengaging movement.

The feeler mechanism for the #1 totalizer line (Figs. 8, 14, 16, 17, and 18) comprises feeler bars 280 and 281, which extend across the selecting disks 259 to 263 inclusive, each of said bars connecting two similar arms free on a shaft 282 carried by a #1 totalizer engaging yoke 283 free on a rod 284. The rod 284 is carried by a yoked member 285 pivoted on trunnions 286 and 287 secured, respectively, in the frame 51 and a partition plate 288 (Fig. 16) supported by the rods 134, 135, and 136. Downward extensions of the feeler bars 280 and 281 (Figs. 14, 17, and 18) have similar locking slots therein, said slots being in reverse relationship to each other, through which extends a stud 289 in the upper end of a link 290, the lower end of which link is pivoted to a lever 291 free on a stud 292 fast in the frame 51. A spring 293 urges the lever 291 clockwise to normally maintain an extension thereof in contact with a stud 294 in an operating spider 295 free on the shaft 105. The spider 295 (Fig. 15) has a slot which engages a stud 296 in one arm of a yoked cam lever 297 free on a stud 298 in the frame 51. Another arm of the lever 297 carries a roller 299, which cooperates with a cam groove 300 in a cam 301 secured on the main cam shaft 130.

Revolution clockwise of the cam 301 rocks the spider 295 first counter-clockwise and back to normal position, according to the time given in space 4 of the time chart, Fig. 28. Initial movement counter-clockwise of the spider 295 (Figs. 15 and 17) withdraws the stud 294 from the extension of the lever 291 to release said lever to the action of the spring 293. However, in adding operations, the total selecting disk 263 (Figs. 19 and 27) is so positioned that a high portion of a control slot 302 therein is opposite a roller 303 carried by the lever 291. Consequently, such clockwise movement of said lever is obstructed, and as a result the stud 289 remains in the locking portions of the slots in the arms of the feelers 280 and 281 (Figs. 17 and 18) to lock said feelers in fixed relationship to each other. When a low portion of the control slot 302 (Figs. 19 and 27) is opposite the roller 303, clockwise movement of the lever 291, under influence of the spring 293, shifts the link 290 and the stud 289 downwardly to move said stud into clearance portions of the locking slots in the arms of the feelers 280 and 281, to disconnect said feelers so that they will be inoperative to select the #1 totalizer line for engaging and disengaging movement.

By referring to Fig. 15, it will be seen that the yoke 285 has an extension carrying a stud 306, which engages a slot in one leg of the spider 295. Consequently, movement of said spider rocks the yoke 285 first clockwise and back to normal position, according to the time given in space 4 of the chart, Fig. 28. The trunnions 286 and 287 form a fulcrum point for said yoke 285 (Figs. 16 and 18). Initial movement clockwise of the yoke 285 (Figs. 14, 16, 17, and 18), by means of the rod 284, carries the yoke 283 downwardly in unison therewith, and said yoke 283, by means of the shaft 282, in turn carries the feelers 280 and 281 downwardly, to cause said feelers to feel the periphery of the selecting disks. By observing Figs. 8 and 16, it will be seen that the feeler 281 is undercut so that it cooperates only with the total selecting disk 263, while the feeler 280 cooperates with the peripheries of all the selecting disks, including the transaction disk and the total selecting disk.

By referring to Fig. 27, it will be noted that, when the total selecting disk 263 is in adding position, a high portion 307 of the periphery thereof is always opposite the feeler 281 to obstruct downward movement of said feeler. In this particular type of feeling mechanism, two high points are required, one opposite each of the feelers 280 and 281, to select, and, conversely, only one low point opposite either of said feelers 280 and 281 to reject.

Depression of any one of the keys 55 to 63 (Figs. 22 and 26) in the first transaction bank positions the selecting disk 259 for this bank, so that the one of a series of high points 308 thereon corresponding to the depressed key is opposite the feeler 280 to block downward movement of said feeler. Inasmuch as downward movement of the other feeler 281 is always blocked in adding operations, downward movement of said feelers and the shaft 282 (Figs. 16 and 18) is obstructed, causing said shaft 282 to become the fulcrum point for the yoke 283. Continued clockwise movement of the yoke 285 (Figs. 16, 17, and 18) causes the yoke 283 to be rocked in a clockwise direction also.

An extension of the yoke 283 (Figs. 5, 12, 17, and 18) has therein an opening 309, which cooperates with a stud 310 in a link 311 pivotally connected to the lower end of a lever 312 free on a stud 313 in the frame 51. A link 314 pivotally connects the lever 312 to the upper end of a lever 315 secured on the shaft 243, said lever carrying a roller 316, which engages a camming slot 317 in a totalizer engaging plate 318 secured to the frame 51. A tenon on the end of the shaft 243 rotatably supports a roller 319, which engages a radial slot 320 in the plate 318. The left-hand end of the shaft 243 supports a roller, similar to the roller 319, which cooperates with a radial slot in a left-hand engaging plate similar to the plate 318, said plate having a camming slot, similar to the slot 317, which cooperates with a roller carried by a crank secured on the left-hand end of the shaft 243, such engaging mechanism for the left-hand end of the shaft 243 not being shown here.

A spring 321 (Fig. 12) urges the link 311 clockwise to normally maintain a stud 322, carried thereby, in engagement with a downward branch of an L-shaped slot 323 in the frame 51. The stud 322 is normally locked in the downward branch of the slot 323 by an arcuate surface 324 on one leg of a totalizer engaging spider 326 integral with a hub 327 free on the shaft 105. The hub 327 (Figs. 5, 12, and 13) has therein a clutch cut, which engages corresponding tenons on a similar hub 328 also free on the shaft 105 and having integral therewith a crank 329. The crank 329 pivotally supports the upper end of an engaging link 330 having in the lower end thereof a stud 331, which cooperates with a slot in an arm 332 secured to a hub 333 free on a stationary stud 334. Also secured to the hub 333 is a cam lever 335 carrying rollers 336 and 337, which cooperate respectively with companion plate cams 338 and 339 secured to the main shaft 130. The cams 338 and 339 drive the spider 326 in adding operations, and the stud 331 is maintained in engagement with the slot in the arm 332 in such operations by the bifurcated lower end of a bell crank 340 free on a stationary stud 341 and having a slotted extension which engages a stud 342 in a lever 343 secured to the shaft 273. A camming slot 344 in the lever 343 engages a stud 345 in a crank 346 secured to the right-hand end of a zero throwout shaft 347 journaled in the machine framework.

In adding operations, no movement is imparted to the zero throwout shaft 347. Consequently, said shaft and the parts secured thereon remain in the positions shown in Fig. 12, to cause the bell crank 340 to retain the stud 331 in engagement with the slot in the arm 332. In adding operations, the cams 338 and 339 rock the spider 326 according to the time given in space 5 of the time chart, Fig. 28, the first movement of said spider being in a counter-clockwise direction. Counter-clockwise movement of the spider 326, at the beginning of an adding operation, moves the arcuate surface 324, on the extension 325, beyond the stud 310, and moves an engaging notch 348, in said extension, in alinement with said stud 310. Immediately after the notch 348 has been alined with the stud 310, the cam 301 (Fig. 15) causes the feeler mechanism to function, as explained above, to rock the yoke 283 clockwise to cause the opening 309 (Figs. 12 and 18), in cooperation with the stud 310, to lift said stud into engagement with the notch 348.

It will be noted by referring to space 2 of the time chart, Fig. 28, that the cams 254 and 255 (Figs. 5 and 6) have shifted the #1 totalizer wheels out of cooperative alinement with the transfer segments and into cooperative alinement with the amount actuators, and that the differential mechanism for the first transaction bank has operated the drum cam 230 to aline the selected set of wheels on the #1 totalizer line with said amount actuators prior to functioning of the feeler mechanism, the timing of which is given in space 4, Fig. 28. After the amount actuators have been positioned under influence of the depressed amount keys, and after the #1 totalizer line has been shifted laterally to aline the selected set of wheels thereon with said actuators, the spider 326 (Fig. 12) is returned clockwise to shift the link 311 rearwardly to rock the lever 312 counter-clockwise, which movement, by means of the link 314, rocks the lever 315 and the shaft 243 also in a counter-clockwise direction. Counter-clockwise movement of the lever 315 causes the roller 316, in cooperation with the camming slot 317, to shift the shaft 243 and the totalizer framework, including said shaft, the side members 242 and 258, and the #1 totalizer line (Figs. 2 and 5), downwardly to engage the selected set of wheels with the amount actuators 104. The totalizer framework is guided in its engaging and disengaging movements by the rollers 319 in cooperation with the radial slots 320, and by the slotted ends of the side members 242 and 258 in cooperation with the blocks 244.

Mechanism actuated by initial or engaging movement of the #1 totalizer framework, including the shaft 243 (Figs. 5 and 21), is provided for alining and locking the cam 230 in selected position to insure that the selected set of totalizer wheels remains in accurate alinement with the amount actuators and transfer segments. Initial downward movement of the shaft 243, under influence of the mechanism shown in Fig. 12 and explained above, causes said shaft, in cooperation with a camming groove 411 in a locking pawl 412 free on a stud 413 in the plate 226, to rock said pawl counter-clockwise.

Counter-clockwise movement of the pawl 412 engages a tooth 414 thereon with one of a series of tooth spaces in a gear 415 on the shaft 225, to aline said shaft and to secure said shaft and the drum cam 230 against further rotary movement, after they have been positioned under influence of the depressed key in the #1 transaction row, to insure that the selected set of wheels on the #1 totalizer line will remain in accurate alinement with the amount actuators and the transfer segments.

After the selected set of totalizer wheels has been engaged with the amount actuators, return movement of said actuators rotates said wheels in an additive direction to add therein the amount set up on the amount keys.

After the amount has been added in the selected set of totalizer wheels, the cams 338 and 339 (Fig. 12 and space 5, Fig. 28) return the spider 326 a slight distance counter-clockwise to partially disengage the totalizer wheels from the amount actuators. During this partial disengagement, the cams 254 and 255 (Fig. 6 and space 2, Fig. 28) function to shift the selected set of totalizer wheels into cooperative alinement with the transfer segments, after which the spider 326 is returned clockwise to engage said selected totalizer wheels with said transfer segments. The transfer mechanism then functions in the manner explained earlier herein to effect the tens transfer.

It will be noted that, when the feeler mechanism, including the yoke 283 (Figs. 12 and 18), lifts the stud 310 into engagement with the notch 348, the stud 322 in the link 311 is simultaneously lifted out of the downward branch of the slot 323 and into alinement with a substantially horizontal branch of said slot, which horizontal branch, in cooperation with said stud, retains the stud 310 in engagement with the notch 348 during engaging and disengaging movement of the totalizer framework.

At the end of machine operations, the engaging spider 326 remains in the position shown in Fig. 12; consequently, the #1 totalizer line remains in engaged position at the end of machine operation. At the beginning of the succeeding operation and prior to initial movement of the actuators, the spider 326 returns the stud 310, the link 311, and associated parts forwardly to impart disengaging movement to the #1 totalizer line, and, when the stud 322 arrives opposite the downward branch of the slot 323, the spring 321 immediately disengages the stud 310 from the notch 348 and engages said stud 322 with said downward branch, as shown in Fig. 12. The notch 348 remains in alinement with the stud 310 until the feeler mechanism functions, so that said stud 310 may again be engaged with the notch 348 in case the #1 totalizer line is again selected for engaging and disengaging movement.

It will be noted by referring to spaces 4 and 5 of the chart, Fig. 28, that, after the selected totalizer line has received engaging movement, the cam 301 (Figs. 14, 15, 17, and 18) restores the feeler mechanism to normal position, in which position a stationary stud 349 is engaged by the angular surfaces of extensions 350 and 351 of the feelers 280 and 281, to insure that said feelers are retained clear of the peripheries of the selecting disks, so as not to interfere with the positioning of said disks. This is especially essential when the stud 289 is moved downwardly into the clearance portions of the slots in the feelers 280 and 281 in reading and resetting operations, as explained earlier.

It will be noted, by observing Figs. 22, 26, and 27, that the selecting disk 259 for the first row of transaction keys has nine projections 352 thereon corresponding to the nine keys 55 to 63, which are adapted to be brought opposite a feeler 353 for the #2 totalizer line whenever any one of said keys 55 to 63 is depressed, to obstruct full downward movement of said feeler 353. The associated feeler 354 for the #2 totalizer line is likewise obstructed in adding operations by a corresponding projection 355 on the total selecting disk 263. From the above it is apparent that every time a key is depressed in the first transaction row, the #2 totalizer line is automatically selected for engaging and disengaging movement to cause the set of totalizer wheels located in the zero position of said line to be engaged with the amount actuators, to accumulate a group total of the items represented by the keys 55 to 63 of the first transaction row.

The selecting disk 260 (Fig. 24) for the keys 64 to 72 of the second transaction row and the selecting disk 261 (Fig. 25) for the keys 73 to 81 of the third transaction row have projections thereon corresponding respectively to the nine keys in each of these rows, said projections, in cooperation with the feeler 280, effective in adding operations to cause the #1 totalizer line to receive engaging and disengaging movement to engage the set of totalizer wheels located in the zero position thereon with the amount actuators, when any of the keys are depressed in the second and third transaction rows, to cause a group total of the items represented by these keys to be accumulated in the zero set of wheels on the #1 line.

Likewise, the keys 82 to 85 inclusive of the fourth transaction row have corresponding projections on the #4 selecting disk 262, which, in cooperation with the feeler mechanism for the #3 totalizer line, cause said line to receive engaging and disengaging movement, when any one of the keys 82 to 85 is depressed, to cause a group total of the items represented by these keys to be accumulated in the zero set of wheels on the #3 line.

Resetting and transfer total operations

The machine of this invention is conditioned for a resetting or total recording operation by moving the total control lever 95 (Figs. 1 and 22) to "reset" position, depressing the proper total key 91 to 94 inclusive to select the desired totalizer line for engaging and disengaging movement, and finally depressing the proper transaction key in the transaction row corresponding to the selected totalizer line to select the desired set of wheels on said line for resetting. Upon operation of the machine, the selected totalizer set is cleared and the amount therein is recorded.

If it is desired to clear the group totalizers located in the zero positions of the #1, #2, and #3 totalizer lines, the proper total key 91, 92, or 93 is depressed to select the desired line for engaging and disengaging movement, and no key is depressed in the corresponding transaction row. Upon machine operation, the set of group totalizer wheels corresponding to the depressed total key is selected for engaging and disengaging movement to record the total therein.

As previously explained, the four sets of totalizers on the #4 totalizer line corresponding to the transaction keys 86 to 89 inclusive (Fig. 22) are provided for the receiving of totals being cleared from the sets of totalizers on the #1, #2, and #3 totalizer lines, and the set of wheels on the #4 line corresponding to the transaction key 90 is provided for receiving totals being cleared from the sets of group totalizer wheels located in the zero positions of said lines #1, #2, and #3.

As a specific example, if it is desired to preserve a grand total of the amounts in the sets of totalizer wheels on the #1 line corresponding to the transaction keys 55 to 62 inclusive (Fig. 22), the key 88 is used in conjunction with these keys so that the totals being cleared from their corresponding sets of totalizers will be accumulated in the set of wheels on the #4 line corresponding to the key 88. In a like manner, the key 87 is used in conjunction with the keys 64 to 67 inclusive of the second transaction row to cause a grand total of the amounts cleared from the totalizers corresponding to these keys to be accumulated in the set of wheels on the #4 line corresponding to the key 87. Likewise, the key 89 is used in conjunction with the keys 73 to 76 inclusive, and the key 86 is used in conjunction with the keys 77, 78, and 79 to preserve grand totals of these items.

Figure 1:
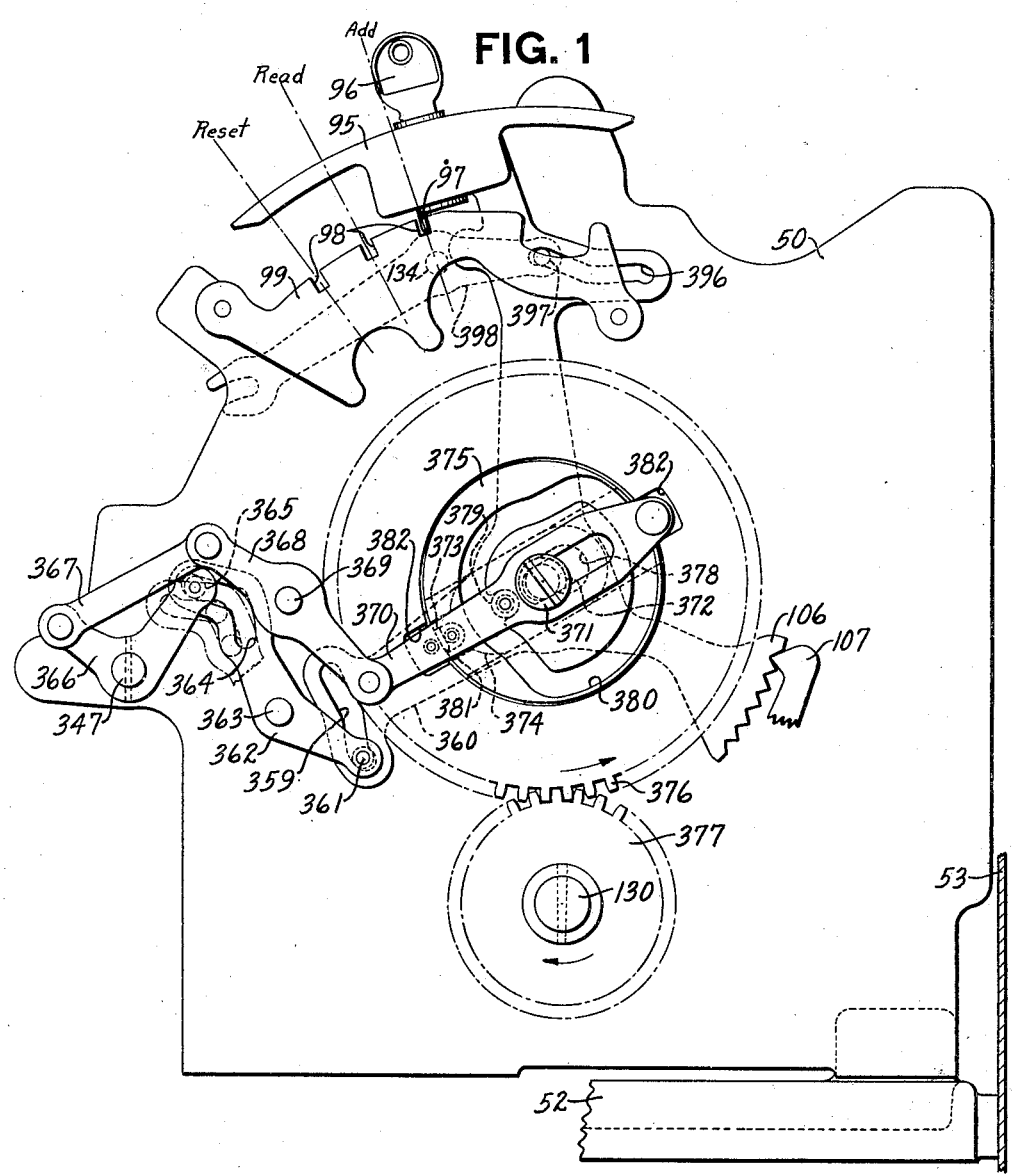
Fig. 1 is an elevation of the right-hand side of the machine, showing in particular a portion of the total control mechanism.

As previously explained, resetting and reading operations require two cycles of movement of the machine mechanism, or two clockwise revolutions of the main cam shaft 130 (Fig. 1). During the first cycle of a resetting or reading operation, the amount actuators are retained in zero positions by the zero stop pawls so that the selected totalizer line may be shifted laterally to aline the desired set of wheels thereon with said actuators. After the selected set of wheels has been alined with the actuators, the selected totalizer line receives engaging movement to engage said wheels with said actuators prior to the beginning of the second cycle of operation. The selected set of wheels remains in engagement with the actuators during their initial movement in the second cycle, which movement reversely rotates said wheels to zero and positions said actuators in accordance with the amount thereon. In resetting operations, after the selected set of wheels has been turned to zero, the wheels are disengaged from the amount actuators and consequently remain in a zeroized condition.

In transfer total operations, the set of totalizer wheels on the #4 line corresponding to the depressed key 86 to 90 inclusive is engaged with the amount actuators after they have been positioned as explained above and prior to their return movement, which movement rotates said selected set of wheels in an additive direction, to enter therein the amount cleared from the selected totalizer set on the #1, #2, or #3 totalizer lines. The present machine is so constructed that the totals may be transferred only in resetting operations, means being provided for rendering the transfer total mechanism inoperative in reading or sub-total recording operations.

In reading or sub-total recording operations, the selected set of totalizer wheels is not disengaged from the actuators after said wheels have been turned to zero thereby, as explained above, but instead remain in engagement with said actuators during their return movement, and, as a result, are restored to their original positions.

The resetting and transfer total mechanism will now be described in detail.

Moving the total control lever 95 (Figs. 1 and 5) from "add" position to either "read" or "reset" position causes a cam slot 359 in an extension 360 thereof, in cooperation with a stud 361 in a lever 362 pivoted on a stud 363 in the frame 50, to rock said lever counter-clockwise from the position here shown in full lines to the position shown in dot-and-dash lines. Counter-clockwise movement of the lever 362 causes a cam slot 364 therein, in cooperation with a stud 365 in a bell crank 366 secured on the zero throwout shaft 347, to rock said bell crank and said shaft clockwise a slight distance. A link 367 connects the bell crank 366 to a lever 368 free on a stud 369 in the frame 50. The lower end of the lever 368 is connected to a pitman 370 shiftably mounted by means of a slot therein in cooperation with a shoulder screw 371 threaded in a trunnion stud 372 secured in the frame 50, said stud 372 being in axial alinement with the shaft 105. Initial clockwise movement of the bell crank 366, through the link 367 and the lever 368, shifts the pitman 370 forwardly or toward the left as viewed in Fig. 1.

The pitman 370 carries two studs which straddle an upturned extension 373 on a connecting slide 374 free in a slot in a cam 375 rotatably mounted on the trunnion stud 372 and free in a boring in the face of a gear 376 rotatably supported by the trunnion stud 372. The gear 376 meshes with a gear 377 secured on the main cam shaft 130, and said parts drive said gear 376 one-half revolution counter-clockwise in adding operations and one such revolution in sub-total and total recording operations. The slide 374 has a slot 378 with a flat portion which engages a corresponding flat portion on the trunnion stud 372 when the total control lever 95 is in "add" or home position, as here shown, to hold said slide and the cam 375 against rotation. The pitman 370 carries a roller 379 adapted to cooperate with a cam groove 380 in the cam 375 in reading and resetting operations. However, when the total control lever 95 is in "add" position, said roller 379 engages a notch in the heart of the cam 375 and adjacent the groove 380, to assist in holding said cam stationary in adding operations.

Forward movement of the pitman 370, when the total control lever 95 is moved to reading or resetting position, causes the studs therein, in cooperation with the extension 373, to shift the slide 374 forwardly or toward the left, to engage an extension 381 on the right-hand end thereof with either of two diametrically opposed notches 382 cut in the face of the gear 376 and connecting with the boring for the cam 375. Likewise, forward movement of the pitman 370 disengages the roller 379 from the notch in the heart of the cam 375 and moves said roller into the camming groove 380. This connects the cam 375 to the gear 376 so that said cam will rotate in unison therewith one counter-clockwise revolution in reading and resetting operations to cause the roller 379, in cooperation with the cam groove 380, to shift the pitman 370 back and forth according to the time given in space 7 of the time chart, Fig. 28. Initial movement toward the left of the pitman 370, by the cam groove 380, through the lever 368 and the link 367, rocks the bell crank 366 and the shaft 347 clockwise an additional distance.

Initial movement clockwise of the shaft 347 (Figs. 1 and 12), under influence of the total control lever 95, when said lever is moved from "add" to either "read" or "reset" position, causes the stud 345 in the crank 346 to travel in a portion of the slot 344 concentric with the center of said shaft 347; consequently, no movement is imparted to the lever 343 and the shaft 273 during this initial movement. However, when the cam 375 imparts additional clockwise movement to the shaft 347, the stud 345, in cooperation with the slot 344, rocks the lever 343 and the shaft 273 counter-clockwise, which movement, by means of the stud 342, rocks the bell crank 340 clockwise. Clockwise movement of the bell crank 340, through the bifurcated extension thereof and the stud 331, rocks the link 330 clockwise to disengage the stud 331 from the notch in the end of the arm 332 and simultaneously to engage a stud 383 (Figs. 12 and 13), carried by said link 330, with a notch 384 in a hook-shaped extension of a cam lever 385 free on the stud 334. The cam lever 385 carries rollers 386 and 387, which cooperate with the peripheries of companion plate cams 388 and 389 secured on the main cam shaft 130.

The shifting of the link 330 (Figs. 12 and 13) in reading and resetting operations shifts the control of the movement of the engaging spider 326 from the cams 338 and 339 to the cams 388 and 389, the timing of the latter being given in space 6 of the time chart, Fig. 28, near the end of the first cycle of operation. The cams 388 and 389 cause the selected totalizer set to remain in engagement with the actuators during their initial movement in the second cycle of operation, which movement turns said wheels to zero and positions said actuators and the recording mechanism in accordance therewith. After the wheels of the selected totalizer have thus been turned to zero, the cams 388 and 389 (Figs. 12, 13, and 28), through the mechanism here shown, rock the engaging spider 326 counter-clockwise to disengage the selected set of totalizer wheels from the amount actuators, and mechanism presently to be described shifts the total-selecting disk 263 (Fig. 27) a slight distance counterclockwise to render the feeler mechanism for the selected totalizer line inoperative, so that the stud 310 (Fig. 12) will not remain in engagement with the notch 348, but instead will be moved to disengaged position, as shown in Fig. 12, by the spring 321.

*Auxiliary movement of the total-selecting disk*

As previously brought out, the total control keys 91 to 94 (Figs. 4, 5, and 22) control the positioning of a differential mechanism similar in every respect to that of the first transaction bank, shown in Fig. 4 and described earlier herein, and said differential mechanism is connected by one of the tubes 218 (Figs. 4, 5, and 19), the crank 256, the link 275, the bell crank 276, the stud 277, and the slot 257 to the total-selecting disk 263, which disk is positioned in accordance with the depressed total key by the above connections.

When it is desired to reset or totalize the totalizers on the #1 totalizer line (Fig. 22), the #1 total key 91 is depressed to select the #1 totalizer line for engaging and disengaging movement, and the desired one of the #1 transaction keys 55 to 63 inclusive is also depressed to select the desired set of wheels on the #1 line for resetting. The total key 91 is located in the second position of the total bank, and naturally the total differential mechanism will be positioned in accordance therewith to position the total-selecting disk 263 (Fig. 27) in second position. When the disk 263 is in second position, projections 390 and 391 on the periphery thereof are positioned opposite the feelers 280 and 281 to obstruct downward movement of said feelers, to cause the #1 totalizer line to receive engaging and disengaging movement. Likewise, moving of the selecting disk 263 to second position brings a projection 392 in the slot 302 opposite the roller 303 (Figs. 17 and 27) to retain the lever 291 and the link 290 in their upward positions, as here shown, to cause the stud 289 to continue to hold the feelers 280 and 281 in rigid or fixed relationship to each other, so that the feeler mechanism may function. It will likewise be noted that moving of the selecting disk 263 (Fig. 27) to second position places clearance, or low, portions in the three other slots in said disk 263 opposite the rollers 405, 304 and 417 for the second, third, and fourth totalizer lines. This causes the levers and the links for said second, third, and fourth totalizer lines, corresponding to the lever 291 and the link 290 for the #1 line, (Figs. 15 and 17) to move clockwise under influence of their springs, upon counter-clockwise movement of the spider 295, to render the feeler mechanism for the second, third, and fourth totalizer lines ineffective, so that, regardless of the position of the three transaction selecting disks, these totalizer lines will not receive engaging and disengaging movement.

The obstructing of downward movement of the feelers 280 and 281 for the #1 totalizer line causes the yoke 283 (Figs. 12, 17, and 18) to lift the stud 310 into engagement with the notch 348 in the spider 326 after said notch has been brought into alinement with said stud under influence of the cams 338 and 339 (Fig. 12 and space 5 of the chart, Fig. 28), and return movement clockwise of said spider 326 engages the wheels of the selected totalizer with the amount actuators, which, it will be recalled, are retained in zero position during the first cycle of a resetting operation.

After the selected set of totalizer wheels on the #1 line has been engaged with the amount actuators, the mechanism under control of the zero throwout shaft 347 (Figs. 12 and 13) shifts the control of the operation of the spider 326 from the cams 338 and 339 to the cams 388 and 389, in the manner explained earlier herein. Near the end of the first cycle of a resetting operation, the mechanism shown in Fig. 1 and explained previously imparts full clockwise movement to the zero throwout shaft 347 to rock the shaft 273 counter-clockwise. This movement of the shaft 273, by means of a slot in the upper end of an arm 393 (Fig. 14) secured on said shaft 273, in cooperation with a stud 394 in one end of a link 395 pivoted to an arm of the yoke 272, rocks said yoke, the sleeve 271, and the arms 270 and 279 (Figs. 14 and 19) counter-clockwise in unison therewith. Counter-clockwise movement of the arms 270 and 279 shifts their respective links 269 and 278 upwardly, causing the stud 277 in the link 278, in cooperation with the slot 257 in the total-selecting disk 263, to move said disk 263 the equivalent of one step in a counterclockwise direction immediately after the #1 totalizer line has received engaging movement. Moving the selecting disk 263 (Figs. 19 and 27) one step in a counter-clockwise direction moves the projection 392 out of the path of the roller 303 and simultaneously moves a low portion of the slot 302 opposite said stud to render the feeler mechanism for the #1 totalizer line inoperative during the second cycle of a resetting operation, so that the selected set of wheels thereon will remain in a zeroized condition.

While the disk 263 is receiving its one step of movement above mentioned, the transaction disk 259, through its slot 274 and the stud 268, receives only one half step of movement in a clockwise direction, for the purpose of selection during operations involving the transfer of totals.

The cams 388 and 389 (Fig. 13 and space 6, Fig. 28) retain the selected set of wheels on the #1 totalizer line in engagement with the amount actuators during initial movement of said actuators in the second cycle of said resetting operation, which initial movement returns said wheels to zero position to position said actuators and the recording mechanism in accordance therewith. After the selected set of wheels on the #1 line has been turned to zero, the cams 388 and 389 impart disengaging movement to the #1 totalizer line to disengage said wheels from the amount actuators, so that they will remain in a zeroized condition.

Prior to return movement of the amount actuators in the second cycle of a resetting operation, the cams 388 and 389 (Figs. 12 and 13) impart engaging and disengaging movement to the spider 326 for the transferring of totals to totalizers on the #4 line, as will be explained later. However, the auxiliary shifting of the total selecting disk 263, under influence of the zero throwout shaft 347 and the mechanism shown in Fig. 19, has rendered the feeler mechanism for the #1 totalizer line inoperative prior to operation of the spider 326, and, as a result, said #1 totalizer line will not receive engaging and disengaging movement in the second cycle of a resetting operation.

Moving the total control lever 95 (Figs. 1 and 14) to "read" position causes a camming slot 396 in an upward extension of said lever, in cooperation with a stud 397 in a lever 398 pivoted on the rod 134, to rock said lever 398 clockwise. Clockwise movement of the lever 398 causes a slot in the forward end thereof, in cooperation with the stud 394, to lift said stud and the link 395 to disengage said stud from the notch in the end of the arm 393 to disconnect the yoke 272 from said arm 393 so that the arms 270 and 279 (Figs. 14 and 19) will receive no movement in reading operations.

In this case, the link 278 and the stud 277 do not impart auxiliary clockwise movement to the total-selecting disk 263; therefore, the projection 392 (Fig. 27) remains opposite the roller 303 during the second cycle of "read" operations. As a result, the feeler mechanism for the #1 totalizer line remains effective and, under influence of the projections 390 and 391, causes the stud 310 (Fig. 12) to be engaged with the notch 348 when said notch is brought opposite said stud in the second cycle of reading operations. This causes the #1 totalizer line to receive engaging movement prior to return movement of the amount actuators in the second cycle of reading operations, so that said return movement will restore the selected set of wheels on the #1 totalizer line to their original positions, thus effecting a reading or sub-total recording operation.

The contour of the cam slot 396 (Figs. 1 and 14) is such that, when the total control lever 95 is in "add" or "reset" position, the stud 394 is retained in engagement with the notch in the upper end of the arm 393. However, this is of no importance in adding operations, as the shaft 273 remains stationary in such operations, and consequently the studs 268 and 277 (Figs. 14 and 19) remain in their downward positions as here shown, and, in this case, no auxiliary movement is imparted to the transaction or total-selecting disks.

The cam 245 (Figs. 5, 6, and 7) for imparting auxiliary shifting movement to the totalizer lines, for the transferring of tens digits, is disconnected from its operating cams 254 and 255 near the end of the first cycle of reading and resetting operations and before said cams function to shift the selected set of totalizer wheels back into alinement with the transfer segments. As a result, the selected totalizer wheels remain in alinement with the amount actuators until near the end of the second cycle of reading and resetting operations, at which time the auxiliary shifting mechanism is again rendered operative prior to operation of the transfer mechanism to effect tens transfer in the totalizers on the #4 line, to which totals are being transferred.

The stud 249 in the link 247 (Figs. 5, 6, and 7) engages a curved slot 399 in one arm of a bell crank 400 free on the rod 136, said bell crank having a camming slot 401 in another arm thereof, through which extends a stud 402 in a crank 403 secured on the zero throwout shaft 347. The manual movement clockwise imparted to the shaft 347 when the total control lever 95 (Fig. 1) is moved from "add" to "read" or "reset" position causes the stud 402 to ride in a portion of the cam slot 401, which is concentric with the shaft 347. Consequently, the manual movement of said shaft imparts no movement to the bell crank 400; however, when the cam 375 (Fig. 1 and space 7, Fig. 28) completes the clockwise movement of the shaft 347, the stud 402 (Figs. 6 and 7), in cooperation with the cam slot 401, rocks the bell crank 400 counter-clockwise, causing the slot 399 to lift the stud 249 out of engagement with the notch in the end of the arm 248. This disconnects the transfer shifting cam 245 from its operating mechanism, including the cams 254 and 255, after said cams have shifted the selected totalizer out of alinement with the transfer segments and into alinement with the amount actuators at the beginning of said reading or resetting operation and before said mechanism functions to shift the selected totalizer set back into alinement with the transfer segments near the end of said first cycle. This results in the selected totalizer set remaining in alinement with the amount actuators until near the end of the second cycle of reading or resetting operations, whereupon return movement counter-clockwise of the zero throwout shaft 347 (space 7, Fig. 28) reengages the stud 249 with the notch in the end of the arm 248, to cause the selected totalizer wheels to be moved into aline-ment with the transfer segments prior to operation of the transfer mechanism, so that tens digits will be transferred from lower to higher denominations in transfer total operations.

While the mechanism outlined above for controlling the transfer shifting mechanism functions both in reading and in resetting operations, it is of importance only in resetting or total-recording operations, where the amounts being cleared from certain totalizers are simultaneously accumulated or transferred in other totalizers. In the present embodiment, the transferring of totals never occurs in reading or sub-total recording operations.

The #3 and #4 totalizer lines are selected for engaging and disengaging, in reading and resetting operations, in exactly the same manner as explained for the #1 totalizer line. However, a slightly different method is employed for selecting the #2 totalizer line for engaging and disengaging movement in such operations.

Depression of the #2 total key 92 (Figs. 5 and 22) for selecting the #2 totalizer line for engaging and disengaging movement in reading and resetting operations causes the total differential mechanism to position the total-selecting disk 263 (Figs. 9 and 27) to fourth position, in which position an open portion of a slot 404 is opposite a roller 405, and consequently said roller is free to move downwardly to disable the feeler mechanism, including the feelers 353 and 354 for the #2 totalizer line. The slot 404 and the roller 405 correspond to the slot 302 and the roller 303 for the #1 totalizer line. Movement of the total-selecting disk 263 to fourth position also causes a projection 406 on the periphery of said disk to move opposite a finger 407 secured on a rod 408, similar in every respect to the shaft 282 for the feelers 280 and 281, to obstruct radial movement of said rod 408 to render the feeler mechanism for the #2 totalizer line effective to cause said line to receive engaging and disengaging movement under influence of the spider 326 (Fig. 12). In resetting or total recording operations, the stud 277 (Figs. 19 and 27), in cooperation with the slot 257, moves the total-selecting disk 263 one step counter-clockwise, as explained before, to move the projection 406 out of the path of the finger 407, so that the selected totalizer set will remain in a zeroized condition. In reading or sub-total recording operations, the projection 406 remains in the path of the finger 407 to cause the amount to be reentered in the selected totalizer.

*Transfer total mechanism*

The sets of totalizer wheels on the #4 totalizer line (Fig. 22), corresponding to the keys 86 to 90 inclusive of the fourth transaction row, are reserved for the transferring of totals; that is, amounts cleared from certain of the totalizers on the #1, #2, and #3 totalizer lines may be accumulated in the corresponding sets of wheels on the #4 totalizer line by depression of the proper key 86 to 90. For example, a grand total of the items represented by the keys 55 to 62 inclusive of the first transaction row may be obtained by depression of the key 88 of the fourth transaction row in conjunction with said keys 55 to 62 in resetting operations, and the result will be the clearing of the totalizers on the #1 line, corresponding to said keys 55 to 62, and the accumulation of a grand total in the set of wheels on the #4 line, corresponding to the key 88.

The total-selecting disk 263 has therein a control slot 416 (Figs. 17, 19, and 27) for controlling the effectiveness of the feeler mechanism for the #4 totalizer line. The slot 416 has cooperating therewith a roller 417 carried by an arm 418 pivoted on a fixed stud 419 and urged clockwise by a spring 420 to normally maintain a prominence 1421 thereon in contact with the corresponding one of the studs 294 in the spider 295. Pivoted on the arm 418 is one end of a link 421 having in its upper end a stud 422, which cooperates with slots in extensions of feelers 423 and 424 for the #4 totalizer line. The feelers 423 and 424 are pivoted on a rod 425 supported by a yoke 426 pivoted on a rod 427 (Figs. 14, 15, and 16) mounted in a yoke 428 in turn pivoted on trunnions 429 carried respectively by the plates 51 and 288. An extension of the yoke 428 (Fig. 15) carries a stud 430, which engages a notch in one arm of the spider 295, and said spider actuates said yoke in exactly the same manner as it actuates the yoke 285 for the #1 feeler mechanism.

The feeler mechanism described above for the #4 totalizer line is similar in every respect to and operates exactly like the feeler mechanism for the #1 totalizer line shown in Figs. 16, 17, and 18 and described earlier herein.

As a specific example of the transferring of totals, let it be assumed that it is desired to transfer totals from the sets of totalizers on the #1 totalizer line corresponding to the keys 55 to 62 (Fig. 22) of the first transaction row to the set of totalizer wheels on the #4 totalizer line corresponding to the key 88 of the fourth transaction row.

In the transferring of totals, the totalizers on the #1 totalizer line are cleared in the usual manner by use of the keys 55 to 62 in conjunction with the #1 total key 91, in the manner explained earlier herein, and, in addition, the key 88 of the fourth transaction row is depressed in conjunction therewith.

Depression of the key 88 in the fourth transaction row causes the selecting disk 262 (Fig. 23) for this row to be positioned in seventh position, in which position a solid portion 431 of the periphery thereof is brought opposite the feeler 423 (Fig. 23). Depression of the total key 91 causes the total-selecting disk 263 (Fig. 27) to be positioned in second position, in which position a notch 432 in the slot 416 is brought opposite the roller 417 to render the feeler mechanism for the #4 totalizer line inoperative during the first cycle of a transfer total operation. Likewise, when the total-selecting disk 263 is in second position, a low portion of the periphery thereof is brought opposite the feeler 424 to prevent the feeler mechanism from selecting the #4 totalizer line for engaging and disengaging movement.

Near the end of the first cycle of a transfer total operation, the auxiliary shifting mechanism for the total-selecting disk 263, including the stud 277 and the cam slot 257 (Figs. 19 and 27), shifts said disk one space in a counter-clockwise direction to bring a high portion of the slot 432 opposite the roller 417 and to bring a high portion 433 of the periphery of said selecting disk 263 opposite the feeler 424. At the time auxiliary shifting movement is being imparted to the total-selecting disk 263, one half step of movement in a clockwise direction is being imparted to the #4 selecting disk 262 (Fig. 23) by a stud 434 in cooperation with a slot 435, said stud and said slot being similar in every respect to and operating exactly like the stud 268, slot 274 (Fig. 26), and associated mechanism for the #1 selecting disk 259.

In transfer total operations, auxiliary shifting movement of the #4 selecting disk 262 (Fig. 23) accomplishes no useful purpose, as the solid portion 431 of the periphery of said disk continues to obstruct the feeler 423. Therefore, as the high portion 433 of the total disk 263 (Fig. 27) is positioned opposite the feeler 424, the engaging mechanism for the #4 totalizer line, which is shown in Fig. 12 and which is similar to and operates exactly like the engaging mechanism for the #1 totalizer line, explained previously, is rendered effective during the second cycle of transfer total operations. The engaging mechanism for the #4 totalizer line, which at this time is under control of the cams 388 and 389 (Fig. 13 and space 6 of the chart, Fig. 28), causes the #4 totalizer line to receive engaging movement after the amount actuators (Fig. 2 and space 1, Fig. 28) have turned the wheels of the selected totalizer on the #1 line to zero and as a result have been positioned in accordance with the amount standing on said totalizer wheels. Return movement of the amount actuators to home position causes the set of totalizer wheels on the #4 totalizer line, corresponding to the depressed key 88, to be rotated in an additive direction in accordance with the amount cleared from the selected set of wheels on the #1 totalizer line, to effect a transfer of totals.

In a like manner, totals may be transferred from the sets of totalizers on the #2 totalizer line, corresponding to the keys 64 to 67 inclusive (Fig. 22), to the totalizer set on the #4 line corresponding to the key 87, and totals may be transferred from the sets of totalizers on the #3 totalizer line, corresponding to the keys 73 to 76 inclusive, to the totalizer set on the #4 line corresponding to the key 89. Totals may also be transferred from the sets of totalizers on the #3 totalizer line, corresponding to the keys 77, 78, and 79, to the totalizer set on the #4 line corresponding to the key 86, in exactly the same manner as explained above. Likewise, the group totals stored in the sets of totalizers corresponding to the zero positions of the #1, #2, and #3 totalizer lines may be transferred to the totalizer set on the #4 line corresponding to the key 90 by use of this key when these sets of group totalizers are reset.

The sets of totalizers on the #4 totalizer line, corresponding to the keys 82 to 85 of the fourth transaction row, are not used for the transferring of totals, but instead are used in exactly the same manner as the sets of totalizers on the #1, #2, and #3 totalizer lines for the accumulation of various items. Therefore, the auxiliary shifting of the #4 selecting disk 262 is utilized to prevent these sets of totalizers from being inadvertently selected for transfer total operations.

In case the keys 82 to 85 are inadvertently used in conjunction with the keys of rows 1, 2, and 3 and the corresponding total keys 91, 92 and 93 in transfer total operations, during the first cycle of such operations the one of a series of projections 436 on the periphery of the disk 262 corresponding to the depressed keys 82 to 85 will be positioned opposite the feeler 423. However, during the first cycle of such operations, the total-selecting disk 263 will be so positioned under influence of the depressed total key that a low portion of the slot 416 will be opposite the roller 417, and a low spot on the periphery of said disk will be opposite the feeler 424. Consequently, during the first cycle of operation, the feeler mechanism for the #4 totalizer line will be rendered inoperative as in all transfer total operations. Near the end of the first cycle of such operation, the auxiliary movement of the disk 262, through the stud 434 and the slot 435, moves the projection 436 on the periphery thereof away from the feeler 423 and brings a notched or low portion of said periphery opposite said feeler to cause the feeler mechanism to render the engaging mechanism for the #4 totalizer line inoperative to prevent the transfer of totals to the sets of totalizers on said line corresponding to the keys 82 to 85 inclusive.

It will be noted that the selecting disks 260 and 261 (Figs. 24 and 25) for the #2 and the #3 totalizer lines have slots and studs 437, 438, 439, and 440 for imparting auxiliary clockwise shifting movement to said disks in exactly the same manner as explained for the #1 selecting disk 259 (Fig. 26). The auxiliary shifting of the selecting disks 259, 260, and 261 for the #1, #2, and #3 totalizer lines makes it possible to use the sets of totalizers on these lines for the receiving of totals cleared from other sets of totalizers, in exactly the same manner as certain of the sets of totalizers on the #4 totalizer line are used to receive totals cleared from the totalizers on the #1, #2, and #3 totalizer lines, as explained above. However, the system chosen for use in the machine embodying this invention requires only that totals be transferred from certain of the sets of totalizers on the #1, #2, and #3 totalizer lines to certain sets of totalizers on the #4 line.

Mode of Operation

While it is believed that a thorough understanding of the mode of operation of the machine embodying the present invention will have been obtained from the preceding specification, still a brief outline of operation will be given, using as a basis a business system adaptable to the requirements of wholesale meat dealers or packing houses and analogous business concerns.

The present machine is arranged for providing a complete sales analysis and a complete invoice of all the items marketed by wholesale meat merchants. The keys of the first three transaction rows (Fig. 22) represent various meat items and other products marketed by a wholesale meat merchant, as also do the first four keys 82 to 85 inclusive of the fourth transaction row. The keys 86 to 89 in the fourth transaction row are used in resetting operations in conjunction with certain of the keys of the first three transaction rows for transferring totals from the sets of totalizers represented by said keys to the sets of totalizers of the #4 totalizer line corresponding to said keys 86 to 89.

In adding operations, the keys 55 to 63 in the first transaction row, in addition to selecting their corresponding sets of totalizers on the #1 line, also automatically select the totalizer set located in zero position on the #2 line, so that a group total of all the items represented by said keys 55 to 63 will be accumulated in said zero totalizer set on the #2 line. In adding operations, the keys 64 to 72 (Fig. 22) in the second transaction row and the keys 73 to 81 on the third transaction row automatically select the totalizer set located in zero position on the #1 totalizer line, to accumulate a group total of all the items represented by said keys 64 to 72 and 73 to 81. The keys 82 to 85 in the fourth transaction row are used in adding operations in exactly the same manner as the keys of the other three transaction rows, and in such operations said keys automatically select the totalizer set located in zero position on the #3 totalizer line, to cause a group total of the items represented by these four keys to be accumulated in said totalizer set.

The amount keys 54, which are used in adding operations in conjunction with the keys of the four transaction rows, may be used for setting up either the number of items or the amount of money, whichever is desirable. The total control lever 95 has three positions—namely, "add," "read," and "reset"—and controls the various functions of the machine. Normally this lever is in "add" position, as here shown.

The four total keys 91 to 94 inclusive (Fig. 22) are provided for selecting their corresponding totalizer lines for engaging and disengaging movement in reading or sub-total taking operations and in resetting or total-taking operations. When it is desired to read or reset the group totalizer sets located in the zero positions of the #1, #2, and #3 totalizer lines, the keys 91, 92, or 93 are depressed alone, without depressing any keys in the corresponding transaction rows. Consequently, the corresponding transaction differential mechanism remains in zero position and, as a result, selects the totalizer set located in this position for engaging and disengaging movement.

All operations of the machine are initiated by use of the starting bar 108 after the total control lever 95 has been properly positioned and the proper transaction and amount keys have been depressed.

Assuming that the amount keys 54 are used for setting up the number of items in adding operations, the operator first ascertains that the total control lever 95 is in "add" position, then he depresses the proper keys 54, after which the proper key is depressed in one of the transaction rows to select the totalizer set corresponding to the desired item, and then the starting bar 108 is depressed to initiate machine operation. During this operation, the number of items set up on the amount keys 54 is added into the selected totalizer set, simultaneously added in the group totalizer set corresponding to the selected transaction row, and recorded on the record material.

If the operator desires to ascertain the total number of items of a particular class sold during a particular period, this is accomplished by moving the total control lever 95 to "read" position, depressing the proper transaction key and the proper total key, and then depressing the starting bar 108 to initiate operation of the machine, during which operation the selected totalizer set is read or sub-totalized and the amount therein is recorded on the record material.

At the end of a certain period, such as a day or a week, it may be desirable to reset or totalize some or all of the various sets of totalizers, and this is accomplished by moving the total control lever 95 to "reset" position and depressing the desired key in the desired transaction row and the corresponding total key, after which the starting bar 108 is depressed to initiate machine operation, during which operation the selected totalizer set is reset and the amount therein is recorded on the record material. Obviously it is possible to read or reset only one totalizer set in each read or reset operation; consequently, the procedure outlined above must be repeated, using the proper transaction keys in conjunction with the corresponding total keys, until the desired totalizer sets are read or reset.

In resetting operations, certain items represented by certain keys in the #1, #2, and #3 transaction rows may be transferred to corresponding sets of totalizers on the #4 line, represented by the keys 86 to 89 inclusive (Fig. 22). For example, in resetting operations, the key 88 in the fourth transaction row may be used in conjunction with the keys 55 to 62 to transfer the totals being cleared from the totalizer sets represented by these keys to the totalizer set on the #4 line corresponding to said key 88. Likewise, use of the key 90 in the fourth transaction row, at the time the group totalizer sets located in the zero positions of the #1, #2, and #3 totalizer lines are being cleared, will cause the totals so cleared to be transferred to the totalizer set on the #4 line corresponding to said key 90.

The operations outlined immediately above, in which totals are cleared from certain totalizer sets and are simultaneously added in other totalizer sets, are referred to throughout the specification as "transfer total operations."

The outline given above is only one suggested use of the machine embodying this invention. However, the machine is very flexible in nature, and, with minor adjustments and alterations, may be adapted to be used in connection with the business systems used by the majority of wholesale merchandising establishments and in connection with the business systems of various other business establishments.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described adapted to perform total-recording or zeroizing operations, said machine having a plurality of denominational actuators and a plurality of totalizer lines, each line supporting a plurality of denominational sets of totalizer elements, said totalizer lines adapted for selecting and engaging and disengaging movements, the combination of means to control the selecting movement of the totalizer lines to aline the various sets of totalizer elements with the actuators; means to impart repeated engaging and disengaging movements to the totalizer lines to engage the selected set of totalizer elements with the actuators for actuation thereby and to disengage said set of totalizer elements from the actuators; total control members; a selecting disk positioned by the total control members; feeler mechanism cooperating with the selecting disk to select the totalizer line corresponding to the effective total control member for actuation by the imparting means, to cause the selected set of totalizer elements thereon to be zeroized; and means effective after the selected totalizer line has received one engaging movement, to further position the selecting disk to render the feeler mechanism ineffective to again select said totalizer line for actuation by the imparting means, to cause the selected set of totalizer elements to remain in a zeroized condition, said last-named means being effective during the same machine operation in which said selected totalizer line has received said one engaging movement.

2. In a machine of the class described adapted to perform total-recording or zeroizing operations and sub-total recording operations, said machine having a plurality of denominational actuators and a plurality of totalizer lines, each line supporting a plurality of denominational sets of totalizer elements, said lines adapted for selecting and engaging and disengaging movements, the combination of means to control the selecting movement of the totalizer lines to aline the various sets of totalizer elements with the actuators; means to impart repeated engaging and disengaging movements to the totalizer lines to engage the selected set of totalizer elements with the actuators for actuation thereby and to disengage said selected set of totalizer elements from the actuators; total control members; a selecting disk movable under the influence of the total control members to various positions corresponding to said members; feeler mechanism cooperating with the selecting disk to select the totalizer line corresponding to the effective control member for actuation by the imparting means to cause the selected set of totalizer elements on said line to be zeroized; means effective, after the selected totalizer line has been engaged, to deliver an auxiliary movement to the selecting disk to render the feeler mechanism ineffective to again select the totalizer line for actuation by the imparting means to cause the selected set of totalizer elements to remain in a zeroized condition; and means, effective in sub-total recording operations, to render the delivering means ineffective to cause the selecting disk, in cooperation with the feeler mechanism, to again select the totalizer line corresponding to the effective total control member, for engaging and disengaging movement to cause the zeroized totalizer elements to be restored to their original positions.

3. In a machine of the character described adapted to perform total-recording or zeroizing operations, said machine having a plurality of denominational actuators and a plurality of totalizer lines, each line supporting a plurality of denominational sets of totalizer elements, said lines adapted for selecting and engaging and disengaging movements, the combination of key-positioned means to control the selecting movement of the totalizer lines, to aline the various sets of totalizer elements thereon with the actuators; means to impart repeated engaging and disengaging movements to the totalizer lines in total-recording operations to engage the selected set of totalizer elements with the actuators for actuation thereby and to disengage said selected set of totalizer elements from the actuators; total control keys to select the different totalizer lines for actuation by the imparting means; a selecting disk; means including a pin-and-slot connection between the selecting disk and the control keys whereby the selecting disk is positioned by the total control keys; feeler mechanism cooperating with the selecting disk to select the totalizer line corresponding to the effective total control key for actuation by the imparting means, to cause the selected set of totalizer elements to be zeroized during total-taking operations; and means effective in said total-recording operations to move said pin in said slot, said pin coacting with said selecting disk to deliver an auxiliary movement to the selecting disk to render the feeler mechanism ineffective, to thereby prevent the feeler mechanism from again selecting the totalizer line for actuation by the imparting means, to thus cause the selected set of totalizer elements to remain in a zeroized condition.

4. In a machine of the character described having a manually settable device for conditioning the machine for adding, reading, and resetting operations, said machine having a plurality of denominational actuators and a plurality of totalizer lines, each line supporting a plurality of sets of denominational totalizer elements, said totalizer lines adapted for selecting movements and engaging and disengaging movements, the combination of key-positioned means to control the selecting movement of the totalizer lines to aline the various sets of totalizer elements thereon with the actuators; means effective, when the manually settable device is set to condition the machine for an adding operation, to impart one engaging and disengaging movement to the selected totalizer line; means, effective when the manually settable device is set to condition the machine for a reading or a resetting operation, to cause the imparting means to impart two engaging and disengaging movements to the selected totalizer line; manipulative members; a selecting disk adapted to be positioned by the manipulative members; a feeler mechanism associated with each manipulative member and with each totalizer line, said feeler mechanisms adapted to cooperate with the selecting disk to be controlled thereby to cause the feeler mechanism associated with the effective manipulative member to operatively connect the totalizer line, corresponding to the effective manipulative member, to the imparting means, to cause the selected set of totalizer elements to be engaged with the actuators in said resetting operation timing; and means, effective when the manually settable device is in resetting position, to cause the selecting disk to receive an auxiliary movement, said feeler mechanism associated with said effective manipulative member thereafter adapted to cooperate with the selecting disk to be controlled thereby to prevent said selected totalizer line from being connected to the imparting means during its second engaging and disengaging movement, so that the selected set of totalizer elements will remain in a cleared or zeroized condition.

5. In a machine of the class described having a manually settable device for conditioning the machine for adding, reading, and resetting operations, said machine also having a plurality of denominational actuators and a plurality of totalizer lines, each line supporting a plurality of sets of denominational totalizer elements, the combination of means to select the various sets of totalizer elements for actuation by the actuators; means to engage and disengage the selected set of totalizer elements with and from the actuators; means effective when the manually settable device is in reading or resetting position, to cause the engaging and disengaging means to receive two engaging and disengaging movements; a manipulative member associated with each of the totalizer lines; a selecting disk differentially positioned by the manipulative members; a feeler mechanism associated with each of the totalizer lines, said feeler mechanisms cooperating with the selecting disk; means operated by one feeler mechanism, when the manipulative member associated therewith is effective, to connect the engaging and disengaging means to the associated totalizer line to cause the selected set of totalizer elements to be zeroized; and means rendered effective when the manually settable device is in resetting position, to impart an auxiliary movement to the selecting disk to thereafter cause the said one feeler mechanism, when cooperating with the moved selecting disk, to prevent the selected totalizer line from becoming connected to the engaging and disengaging means during the second engaging and disengaging movement of the engaging and disengaging means, to thereby cause the selected set of totalizer elements to remain in a zeroized condition.

6. In a machine of the class described adapted to perform adding, reading, and resetting operations and having a plurality of denominational actuators, a plurality of lines of interspersed totalizer sets, and means to select the different totalizer sets for actuation by the actuators, the combination of means to deliver one engaging and disengaging movement to the totalizer lines in adding operations and two such movements in reading and resetting operations; a total control key for each totalizer line; a selecting disk normally in adding position but differentially positionable under influence of the total control keys in reading and resetting operations; a feeler mechanism for each totalizer line, each of said feeler mechanisms comprising two separately movable feeler portions; means to connect the two feeler portions of each feeler mechanism in fixed relationship to each other, said feeler portions, when connected in said fixed relationship, adapted to cooperate with the selecting disk to connect the totalizer line corresponding to the effective total control key to the engaging and disengaging means; control surfaces on the selecting disk cooperating with the connecting means and effective when said selecting disk is differentially positioned under influence of the total control keys, to position the connecting means in the position in which the feeler portions for the feeler mechanism, corresponding to the effective total control key, are held in fixed relationship and to position the connecting means for the feeler portions of the other feeler mechanisms into a position wherein the feeler portions thereof are disconnected from each other; means to impart an auxiliary movement to the selecting disk in resetting operations, after the selected totalizer line has received one engaging and disengaging movement to render the connecting means for the feeler mechanism for said totalizer line ineffective prior to the second movement of the engaging and disengaging means to cause the selected totalizer set to remain in a zeroized condition; and means to render the imparting means ineffective in reading operations, to cause the selected totalizer line to be connected to the engaging and disengaging means during its second movement, to restore the selected totalizer set to its original condition.

7. In a machine of the class described capable of performing transfer total operations and having two totalizer lines each supporting a plurality of interspersed totalizer sets, and means, including a plurality of denominational actuators, for entering amounts in the totalizer sets and for transferring amounts from one totalizer set to another, the combination of means to deliver two engaging and disengaging movements to the totalizer lines in transfer total operations, to engage and disengage the selected totalizer set on each of the two lines with and from the actuators to clear one totalizer set and to add the amount cleared therefrom in the other totalizer set; means, including a set of transaction keys for each totalizer line, said keys corresponding to the different totalizer sets on the corresponding lines, to aline said totalizer sets with the actuators; an add selecting disk for each totalizer line, said disks differentially positioned by the corresponding transaction keys; a total control key for each totalizer line, said keys adapted to be used in conjunction with the corresponding sets of transaction keys to select the corresponding totalizer sets for clearing; a total selecting disk normally in adding position, but differentially positionable under influence of the total control keys, in transfer total operations; a separate means for connecting each of the totalizer lines to the engaging and disengaging means; a feeler mechanism for each totalizer line, each of said feeler mechanisms comprising two feeler portions, said portions when in a certain fixed relationship to each other being effective and when moved relatively to each other from said certain fixed relationship being ineffective, said feelers when in said certain fixed relationship adapted to cooperate with the selecting disks, to selectively engage the corresponding connecting means with the engaging and disengaging means; a second connecting means to connect the two feeler portions of each feeler mechanism in said fixed relationship to each other to render their respective feeler mechanisms effective; control surfaces on the total selecting disk cooperating with the second connecting means and effective when said selecting disk is positioned under influence of the total control keys, to render the feeler mechanism corresponding to the effective total control key effective and to render the other feeler mechanism ineffective; and means to impart an auxiliary movement to the total selecting disk, after the totalizer line selected by the effective total control key and the corresponding transaction key has received one engaging and disengaging movement, to render the connecting means for the feeler mechanism for said totalizer line ineffective during the second movement of the engaging and disengaging means, and to render the connecting means for the feeler mechanism for the other totalizer line effective during the second movement of said engaging and disengaging means, to cause said feeler mechanism to render the means for connecting said totalizer line to the engaging and disengaging means effective prior to the second movement of said engaging and disengaging means to cause the selected totalizer set on one line to be cleared and the amount cleared therefrom transferred to the selected totalizer set on the other line.

8. In a machine of the character described adapted to perform adding and total-recording operations and having a plurality of totalizer lines each supporting a plurality of denominational sets of totalizer elements, said machine also having denominational actuators with which the totalizer elements are selectively engageable for actuation thereby to enter amounts therein and to reset the totalizers to zero, the combination of control keys; selecting disks positioned by the control keys; means cooperating with the selecting disks to select the various totalizer lines for engagement with and disengagement from the actuators; means to actuate the last-named means; means under control of the control keys to select a totalizer from the selected totalizer line; means effective in total-recording operations to readjust one of the selecting disks from the position to which it was adjusted under control of the control keys, said readjustment taking place after the first totalizer line has been selected; and means operable after the denominational actuators have reset the selected totalizer elements to zero, and said one disk has been readjusted, to again operate the means cooperable with the selecting disks to thereby select another totalizer line for engagement with the actuators, whereby the actuators may enter the total taken from the first selected totalizer into a second selected totalizer.

9. In a machine of the class described capable of adding, reading, and resetting operations, said machine having a plurality of denominational actuators and a plurality of totalizer lines, each line supporting a plurality of sets of denominational totalizer elements, said elements engageable with the actuators for actuation thereby, the combination of means to select the various sets of totalizer elements for actuation by the actuators; means to impart engaging and disengaging movement to the totalizer lines to engage and disengage the selected set of totalizer elements with and from the actuators, said means adapted to impart one engaging and disengaging movement in adding operations; a separate total control member associated with each totalizer line, each total control member being movable into an effective position; a selecting disk differentially positioned by the total control members; a separate feeler mechanism associated with each of the totalizer lines and with each of the total control members, and all of said feeler mechanisms being adapted to cooperate with the selecting disk to determine the effectivity of the feeler mechanisms; means operated by the feeler mechanism associated with the effective total control member, and adapted, when cooperating with the selecting disk when the selecting disk has been positioned by said effective control member, to connect the associated totalizer line to the imparting means; means effective in reading and resetting operations to cause the imparting means to receive two engaging and disengaging movements; and means effective in reset operations to deliver an auxiliary movement to the selecting disk, so that when the feeler mechanism for the selected totalizer line again cooperates with the selecting disk, after the imparting means has received one movement in which the selected set of totalizer elements was zeroized, the feeler mechanism will be ineffective to again operate the connecting means, so that said totalizer line will remain disconnected from the imparting means during its second movement to cause the selected set of totalizer elements to remain in a zeroized condition.

10. In a machine of the class described adapted to perform operations for the transferring of totals, said machine having a plurality of denominational actuators and a plurality of totalizer lines, and means for engaging and disengaging the totalizer elements with and from the actuators, the combination of a separate total control key associated with each of the totalizer lines, each key being movable to an effective position; a selecting disk differentially positioned by the total control keys; a separate feeler mechanism for each totalizer line, each feeler mechanism adapted to cooperate with the selecting disk to select the totalizer line associated with the effective total control key for engaging and disengaging movement to cause said selected totalizer to be zeroized; means, effective in transfer total operations, to impart an auxiliary movement to the selecting disk, said feeler mechanisms thereafter movable to again cooperate with the selecting disk to select a totalizer line different from the totalizer line associated with the effective control key for engagement and disengagement with and from the actuators, whereby the amount taken from the totalizer associated with the effective control key is added into said other totalizer; and means to operate the actuators to cause said zeroizing and adding operations to take place after the respective engaging movements have been effected.

11. In a machine of the class described adapted to perform operations in which a total is cleared from one totalizer and transferred to another totalizer, said machine having a plurality of denominational actuators and a plurality of totalizer lines, each line supporting a plurality of sets of denominational totalizer elements, and means for moving said totalizer lines to engage and disengage the totalizer elements with and from the actuators, the combination of a selecting key for each set of totalizer elements; means controlled by the selecting keys to aline the corresponding sets of totalizer elements with the actuators; a total control key for each totalizer line; a total control member adapted to be differentially positioned by the total control keys; sensing means cooperating with the total control member to select one of the totalizer lines for engagement with and disengagement from the actuators during the first of two engaging movements to zeroize the engaged totalizer; means cooperating with the total control member to prevent engagement of the totalizer lines not selected; means operable to impart an auxiliary movement to the total control member; and another sensing means thereafter cooperating with the total control member after the selected totalizer has been zeroized, to cause the set of totalizer elements corresponding to an effective selecting key and on another line, to be engaged with the actuators during the second engaging movement of the totalizer lines to receive the total cleared from the first selected set of totalizer elements.

12. In a machine of the class described adapted to perform adding, reading, and resetting operations, said machine having a plurality of denominational actuators and a plurality of totalizer lines, each line supporting a plurality of sets of denominational totalizer elements, the combination of a selecting key for each set of totalizer elements; means controlled by the selecting keys for alining the corresponding sets of totalizer elements with the actuators; means for engaging and disengaging selected totalizers with and from the actuators in reset timing and in add timing; a total control key for each totalizer line; a control member positioned by the total control keys; a sensing means cooperating with the total control member to cause a selected totalizer on one totalizer line to be engaged with the actuators before the actuators are moved in reset timing; means to impart an auxiliary movement to the control member; another sensing means cooperating with the control member, after said auxiliary movement has been completed to cause another selected totalizer on another line to be engaged with the actuators before the actuators are moved in their add timing to cause the total taken from the first selected totalizer to be added into the second selected totalizer upon subsequent movement of the actuators in add timing; and means, effective in reading operations, to render the imparting means inoperative to prevent auxiliary movement from being imparted to the control member to thus cause the first selected set of totalizer elements to be read and to prevent the amount of said total from being accumulated in another set of totalizer elements.

13. In a machine of the character described adapted to perform transfer total operations, said machine having two totalizer lines, each line supporting a plurality of sets of totalizer elements, and having denominational actuators for the totalizer elements, the combination of a set of selecting keys for each totalizer line, said keys corresponding to the sets of totalizer elements on their corresponding lines; means controlled by the selecting keys to aline the different sets of totalizer elements with the actuators; engaging means to move the totalizer lines toward and from the actuators in total reading timing and in add timing to cause the selected set of totalizer elements to be engaged with and disengaged from the actuators; a total control key associated with one of the totalizer lines; a total selecting disk positioned under control of the total control key; sensing means cooperating with the total selecting disk to selectively connect the line corresponding to the total control key to the engaging means, to thereby cause the selected totalizer elements to be engaged and disengaged in total-recording time; means to impart an auxiliary movement to the total selecting disk; and another sensing means cooperating with the total selecting disk, after receiving said auxiliary movement, to selectively connect another totalizer line to the engaging means, whereby a set of totalizer elements on another line, and corresponding to the other effective selecting key, is engaged and disengaged in adding time, so that the total cleared from the first set of totalizer elements will be accumulated therein.

14. In a machine of the character described adapted to perform transfer total operations, said machine having a plurality of denominational actuators and two totalizer lines each supporting a plurality of sets of totalizer elements, said elements engageable with the actuators for actuation thereby, the combination of a set of selecting keys for each totalizer line, said keys corresponding to the different sets of totalizer elements on the corresponding totalizer lines; means controlled by the selecting keys to aline the different sets of totalizer elements with the actuators; means to impart engaging and disengaging movement to the totalizer lines to engage and disengage the selected totalizer elements with and from the actuators in reset and add timing; a total control key for each of the totalizer lines; a selecting disk common to all the totalizer lines and adapted to be positioned by the total control keys; sensing means cooperating with the selecting disk to select the totalizer line corresponding to the effective total control key, for actuation by the imparting means in reset timing; means thereafter effective, in transfer total operations, to deliver auxiliary movement to the selecting disk; and another sensing means operable after the said auxiliary movement of said disk to cooperate with the selecting disk, to select a second totalizer line for actuation by the imparting means in add timing to cause the total taken from the totalizer on the first selected totalizer line to be transferred to the totalizer elements on the second selected line.

WILLIAM H. ROBERTSON.
WILLIS E. EICKMAN.